United States Patent
Ding et al.

(10) Patent No.: US 9,420,536 B2
(45) Date of Patent: Aug. 16, 2016

(54) CONTROLLING POWER CONSUMPTION IN PEER-TO-PEER COMMUNICATIONS

(71) Applicant: QUALCOMM Incorporated, San Diego, CA (US)

(72) Inventors: Gang Ding, San Diego, CA (US); Vijayalakshmi Rajasundaram Raveendran, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/487,925

(22) Filed: Sep. 16, 2014

(65) Prior Publication Data

US 2015/0358905 A1     Dec. 10, 2015

Related U.S. Application Data

(60) Provisional application No. 62/010,264, filed on Jun. 10, 2014.

(51) Int. Cl.
*H04W 52/02* (2009.01)

(52) U.S. Cl.
CPC ...... *H04W 52/0219* (2013.01); *H04W 52/0209* (2013.01)

(58) Field of Classification Search
CPC .................................................. H04W 52/0219
See application file for complete search history.

(56) References Cited

U.S. PATENT DOCUMENTS

| | | | |
|---|---|---|---|
| 8,391,260 B1 | 3/2013 | Kopikare et al. | |
| 8,717,959 B2 | 5/2014 | Vedantham et al. | |
| 2006/0282601 A1* | 12/2006 | Uchida | G06F 1/3253 710/309 |
| 2008/0297373 A1* | 12/2008 | Hayakawa | H04Q 9/00 340/870.39 |
| 2010/0323647 A1 | 12/2010 | Ryu et al. | |
| 2010/0325459 A1* | 12/2010 | Kangude | H04W 52/0225 713/323 |
| 2012/0195227 A1 | 8/2012 | Vedantham et al. | |
| 2013/0028156 A1 | 1/2013 | Vedantham et al. | |
| 2013/0124894 A1* | 5/2013 | Cho | H04W 52/0229 713/323 |
| 2013/0238919 A1 | 9/2013 | Ponmudi et al. | |
| 2014/0071870 A1* | 3/2014 | Abraham | H04W 52/0206 370/311 |
| 2014/0119252 A1 | 5/2014 | Kella et al. | |
| 2015/0110090 A1* | 4/2015 | Ding | H04W 4/08 370/338 |

OTHER PUBLICATIONS

ISA/EPO, International Search Report and Written Opinion of the International Searching Authority, Int'l App. No. PCT/US2015/034341, Sep. 4, 2015, European Patent Office, Rijswijk, NL, 9 pgs.

* cited by examiner

*Primary Examiner* — Brian D Nguyen
(74) *Attorney, Agent, or Firm* — Holland & Hart LLP

(57) ABSTRACT

Techniques are described for controlling power consumption in a peer-to-peer communication system. In accordance with various examples, the techniques include determining a power save mode of a first node, determining a power save mode of a second node, determining a category of data connection between the first node and the second node, and adjusting a power save parameter of the first node based at least in part on the power save mode of the first node, the power save mode of the second node, and the category of data connection.

30 Claims, 17 Drawing Sheets

CONTROLLING POWER CONSUMPTION IN PEER-TO-PEER COMMUNICATIONS

CROSS REFERENCES

The present application for patent claims priority to U.S. Provisional Patent Application No. 62/010,264 by Ding et al., entitled "Controlling Power Consumption In Peer-To-Peer Communications," filed Jun. 10, 2014, and assigned to the assignee hereof.

BACKGROUND

The following relates generally to wireless communication, and more specifically to peer-to-peer wireless communication. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of devices (or nodes or stations). A peer-to-peer wireless communication system may include a number of nodes that communicate over a wireless local area network (WLAN) or Wi-Fi spectrum in the absence of a controlling access point. A node in the peer-to-peer wireless communication system may conserve power by utilizing a variety of power save modes when connected to another node of the peer-to-peer wireless communication system. However, these power save modes may have an effect on the performance of the nodes in the peer-to-peer wireless communication system.

SUMMARY

The described features generally relate to improved systems, methods, and/or apparatuses for controlling the power consumption of a node in a peer-to-peer wireless communication system. The power consumption of a first node may be controlled by determining a power save mode of the first node and a power save node of a second node connected to the first node. A category of data connection between the first node and the second node may also be determined A power save parameter of the first node may then be adjusted based at least in part on the power save mode of the first node, the power save mode of the second node, and the category of data connection between the nodes. The adjustment to the power save parameter may reduce the performance penalties caused by the power save modes.

In a first set of illustrative examples, a method for controlling power consumption in a group owner node of a peer-to-peer communication system is described. In one example, the method includes determining, by the group owner node, a power save mode of the group owner node and a power save mode of a client node; determining, by the group owner node, a category of data connection between the group owner node and the client node; and adjusting a power save parameter of the group owner node based at least in part on the determined power save mode of the group owner node, the determined power save mode of the client node, and the determined category of data connection.

In some examples, the determined power save mode of the group owner node comprises an opportunistic power save mode, the determined power save mode of the client node comprises a standard power save mode, the determined category of data connection comprises a peer-to-peer bulk data transmission from the group owner node to the client node, and adjusting the power save parameter of the group owner node comprises increasing a client traffic window (CTWindow) of the group owner node to be within a beacon interval. In some examples, the determined power save mode of the group owner node comprises a NoA power save mode, the determined category of data connection comprises a peer-to-peer bulk data transmission from the group owner node to the client node, and adjusting the power save parameter of the group owner node comprises decreasing an absence duration of the group owner node to zero.

In some examples, the determined power save mode of the group owner node comprises an opportunistic power save mode, the determined power save mode of the client node comprises a standard power save mode, the determined category of data connection comprises a peer-to-peer isochronous data transmission from the group owner node to the client node, and adjusting the power save parameter of the group owner node comprises increasing a CTWindow of the group owner node to be within a beacon interval. In some examples, the determined power save mode of the group owner node comprises an opportunistic power save mode, the determined power save mode of the client node comprises a uAPSD power save mode, the determined category of data connection comprises a peer-to-peer isochronous data transmission from the group owner node to the client node, and adjusting the power save parameter of the group owner node comprises increasing a CTWindow of the group owner node to be within a beacon interval. In some examples, the determined power save mode of the group owner node comprises a NoA power save mode, the determined category of data connection comprises a peer-to-peer isochronous data transmission from the group owner node to the client node, and adjusting the power save parameter of the group owner node comprises decreasing an absence duration of the group owner node to zero.

In some examples, adjusting the power save parameter modifies throughput of the data connection between the group owner node and the client node. In some examples, adjusting the power save parameter modifies latency of the data connection between the group owner node and the client node.

In a second set of illustrative examples, a method for controlling power consumption in a client node of a peer-to-peer communication system is described. In one example, the method includes determining, by the client node, a power save mode of the client node, wherein the power save mode of the client node is one of the group consisting of a standard power save mode and an unscheduled Automatic Power Save Delivery (uAPSD) power save mode; determining, by the client node, a power save mode of a group owner node, wherein the power save mode of the group owner node is one of the group consisting of a notice of absence (NoA) power save mode and an opportunistic power save mode; determining, by the client node, a category of data connection between the client node and the group owner node; and adjusting a power save parameter of the client node based at least in part on the determined power save mode of the client node, the determined power save mode of the group owner node, and the determined category of data connection.

In some examples, the determined power save mode of the client node is the standard power save mode, the determined power save mode of the group owner node is the NoA power save mode, the determined category of data connection comprises a peer-to-peer bulk data transmission from the group owner node to the client node, and adjusting the power save parameter of the client node comprises suspending the standard power save mode. In some examples, the determined power save mode of the client node is the uAPSD power save mode, the determined power save mode of the group owner node is the NoA power save mode, the determined category of data connection comprises a peer-to-peer bulk data transmission from the group owner node to the client node, and adjusting the power save parameter of the client node comprises synchronizing a uAPSD trigger of the client node with a presence period of the group owner node. In some examples, the determined power save mode of the client node is the standard power save mode, the determined category of data connection comprises a peer-to-peer isochronous data transmission from the group owner node to the client node, and adjusting the power save parameter of the client node comprises suspending the standard power save mode.

In some examples, the determined power save mode of the client node is the uAPSD power save mode, the determined power save mode of the group owner node is the opportunistic power save mode, the determined category of data connection comprises a peer-to-peer isochronous data transmission from the group owner node to the client node, and adjusting the power save parameter of the client node comprises synchronizing a uAPSD trigger of the client node with a beacon interval of the group owner node. In some examples, the determined power save mode of the client is the uAPSD power save mode, the determined power save mode of the group owner node is the NoA power save mode, the determined category of data connection comprises a peer-to-peer isochronous data transmission from the group owner node to the client node, and adjusting the power save parameter of the client node comprises synchronizing a uAPSD trigger of the client node with a presence period of the group owner node.

In some examples, adjusting the power save parameter modifies throughput of the data connection between the group owner node and the client node. In some examples, adjusting the power save parameter modifies latency of the data connection between the group owner node and the client node.

In a third set of illustrative examples, an apparatus for controlling power consumption in a group owner node of a peer-to-peer communication system is described. In one example, the apparatus may include a power save mode manager for determining, by the group owner node, a power save mode of the group owner node and a power save mode of a client node; a data connection manager for determining, by the group owner node, a category of data connection between the group owner node and the client node; and a parameter adjustment manager for adjusting a power save parameter of the group owner node based at least in part on the determined power save mode of the group owner node, the determined power save mode of the client node, and the determined category of data connection.

In some examples, the determined power save mode of the group owner node comprises an opportunistic power save mode, the determined power save mode of the client node comprises a standard power save mode, the determined category of data connection comprises a peer-to-peer bulk data transmission from the group owner node to the client node, and adjusting the power save parameter of the group owner node comprises increasing a client traffic window (CTWindow) of the group owner node to be within a beacon interval. In some examples, the determined power save mode of the group owner node comprises a NoA power save mode, the determined category of data connection comprises a peer-to-peer bulk data transmission from the group owner node to the client node, and adjusting the power save parameter of the group owner node comprises decreasing an absence duration of the group owner node to zero. In some examples, the determined power save mode of the group owner node comprises an opportunistic power save mode, the determined power save mode of the client node comprises a standard power save mode, the determined category of data connection comprises a peer-to-peer isochronous data transmission from the group owner node to the client node, and adjusting the power save parameter of the group owner node comprises increasing a CTWindow of the group owner node to be within a beacon interval.

In some examples, the determined power save mode of the group owner node comprises an opportunistic power save mode, the determined power save mode of the client node comprises a uAPSD power save mode, the determined category of data connection comprises a peer-to-peer isochronous data transmission from the group owner node to the client node, and adjusting the power save parameter of the group owner node comprises increasing a CTWindow of the group owner node to be within a beacon interval. In some examples, the determined power save mode of the group owner node comprises a NoA power save mode, the determined category of data connection comprises a peer-to-peer isochronous data transmission from the group owner node to the client node, and adjusting the power save parameter of the group owner node comprises decreasing an absence duration of the group owner node to zero. In some examples, adjusting the power save parameter modifies at least one of throughput of the data connection between the group owner node and the client node, latency of the data connection between the group owner node and the client node, or a combination thereof.

In a fourth set of illustrative examples, an apparatus for controlling power consumption in a client node of a peer-to-peer communication system is described. In one example, the apparatus may include a client power save mode manager for determining, by the client node, a power save mode of the client node, wherein the power save mode of the client node is one of the group consisting of a standard power save mode and an unscheduled Automatic Power Save Delivery (uAPSD) power save mode; a group owner power save mode manager determining, by the client node, a power save mode of a group owner node, wherein the power save mode of the group owner node is one of the group consisting of a notice of absence (NoA) power save mode and an opportunistic power save mode; a data connection manager for determining, by the client node, a category of data connection between the client node and the group owner node; and a parameter adjustment manager for adjusting a power save parameter of the client node based at least in part on the determined power save mode of the client node, the determined power save mode of the group owner node, and the determined category of data connection.

In some examples, the determined power save mode of the client node is the standard power save mode, the determined power save mode of the group owner node is the NoA power save mode, the determined category of data connection comprises a peer-to-peer bulk data transmission from the group owner node to the client node, and adjusting the power save parameter of the client node comprises suspending the standard power save mode. In some examples, the determined power save mode of the client node is the uAPSD power save mode, the determined power save mode of the group owner node is the NoA power save mode, the determined category of data connection comprises a peer-to-peer bulk data transmission from the group owner node to the client node, and adjusting the power save parameter of the client node comprises synchronizing a uAPSD trigger of the client node with a presence period of the group owner node. In some examples, the determined power save mode of the client node is the standard power save mode, the determined category of data connection comprises a peer-to-peer isochronous data transmission from the group owner node to the client node, and adjusting the power save parameter of the client node comprises suspending the standard power save mode.

In some examples, the determined power save mode of the client node is the uAPSD power save mode, the determined power save mode of the group owner node is the opportunistic power save mode, the determined category of data connection comprises a peer-to-peer isochronous data transmission from the group owner node to the client node, and adjusting the power save parameter of the client node comprises synchronizing a uAPSD trigger of the client node with a beacon interval of the group owner node. In some examples, the determined power save mode of the client is the uAPSD power save mode, the determined power save mode of the group owner node is the NoA power save mode, the determined category of data connection comprises a peer-to-peer isochronous data transmission from the group owner node to the client node, and adjusting the power save parameter of the client node comprises synchronizing a uAPSD trigger of the client node with a presence period of the group owner node. In some examples, adjusting the power save parameter modifies at least one of throughput of the data connection between the group owner node and the client node, latency of the data connection between the group owner node and the client node, or a combination thereof.

In a fifth set of illustrative examples, another apparatus for controlling power consumption in a peer-to-peer communication system is described. In one configuration, the apparatus includes means for determining a power save mode of a first node, means for determining a power save mode of a second node, means for determining a category of data connection between the first node and the second node, and means for adjusting a power save parameter of the first node. The power save parameter of the first node is adjusted based at least in part on the power save mode of the first node, the power save mode of the second node, and the category of data connection. In some examples, the apparatus may further include means for implementing one or more aspects of the method for controlling power consumption described above with respect to the first and second sets of illustrative examples.

In a sixth set of illustrative examples, a non-transitory computer-readable medium including computer-readable instructions is described. In one configuration, the computer-readable instructions, when executed by a processor, cause the processor to determine a power save mode of a first node, determine a power save mode of a second node, determine a category of data connection between the first node and the second node, and adjust a power save parameter of the first node. The power save parameter of the first node is adjusted based at least in part on the power save mode of the first node, the power save mode of the second node, and the category of data connection. In some examples of the non-transitory computer-readable medium, the instructions may also be executable by the processor to implement one or more aspects of the method for controlling power consumption described above with respect to the first and second sets of illustrative examples.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure describes techniques for controlling the power consumption of a node in a peer-to-peer wireless communication system. As noted above, in some cases, a power save mode of a node in a peer-to-peer wireless communication system may impact the performance of the node. Therefore, examples of the present disclosure may reduce the impact of power save modes on the performance of nodes in a peer-to-peer wireless communication system. The power consumption of the node may be controlled by adjusting a power save parameter of the node based at least in part on the power save mode of the node, the power save mode of another node, and the category of data connection between the nodes.

Wi-Fi is one example of a wireless communication system. Wi-Fi is a popular technology that allows an electronic device to exchange data wirelessly (using radio waves) over a computer network, including high-speed Internet connections. The Wi-Fi Alliance defines Wi-Fi as "any wireless local area network (WLAN) product that are based on the Institute of Electrical and Electronics Engineers (IEEE) 802.11 standards."

Wi-Fi technologies included in the IEEE 802.11 standard include wireless local area network (WLAN) connections, device to device connectivity (such as Wi-Fi Peer-to-Peer, also known as Wi-Fi Direct), personal area network (PAN), local area network (LAN) and even some limited wide area network (WAN) connections.

In order to connect to a WLAN, a computer or other device is equipped with a wireless network interface controller, also referred to as a wireless modem. The combination of the computer or device and the wireless network interface controller may be known as a station or node. Stations share a single radio frequency communication channel. Transmission on this channel is received by stations within range. The hardware does not signal the user that the transmission was delivered and therefore, the delivery mechanism is known as a "best effort" delivery mechanism. A carrier wave transmits the data in packets, which may be referred to as "Ethernet frames". A station is constantly tuned to the radio frequency communication channel in order to receive available transmissions.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
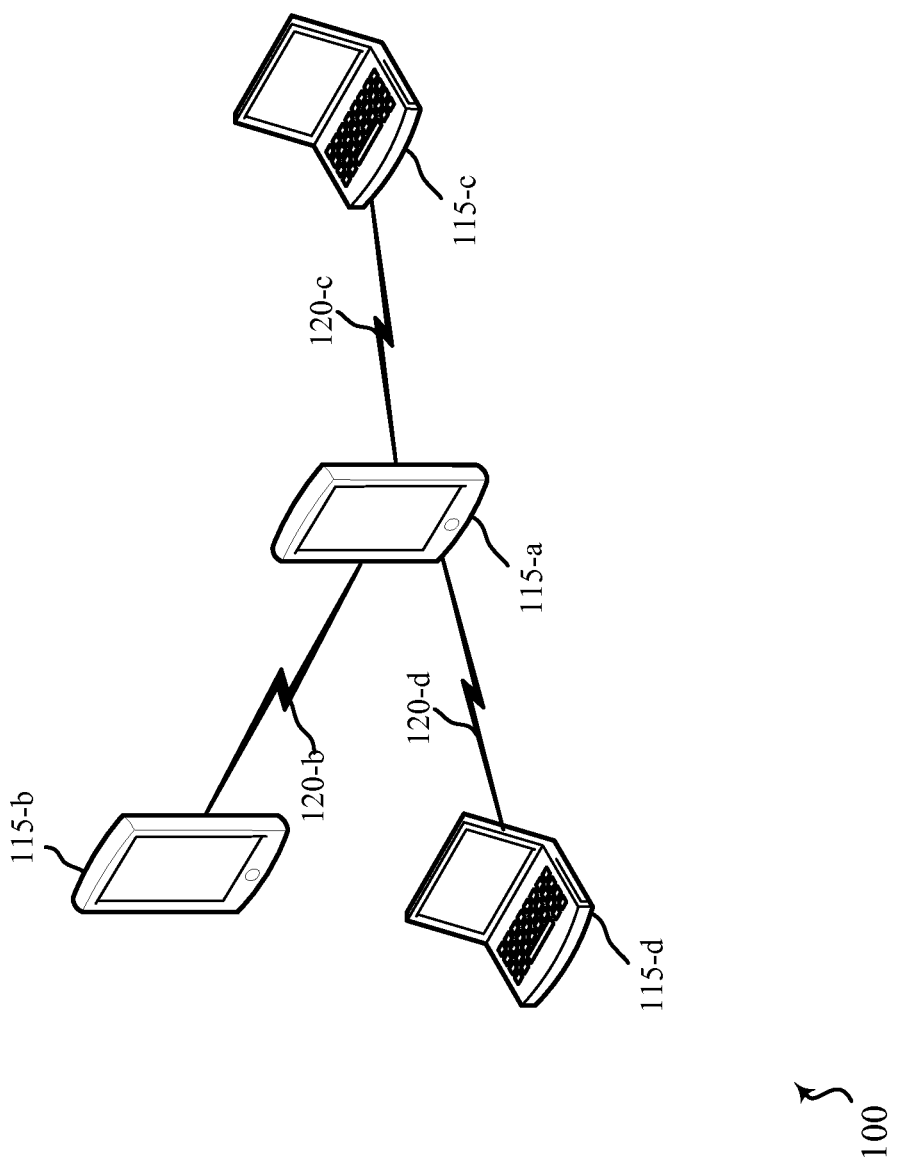
FIG. 1 shows a block diagram of a wireless peer-to-peer arrangement, in accordance with the principles of the present disclosure.

Referring first to FIG. 1, a peer-to-peer arrangement 100 is shown that may allow devices to communicate with each other in the absence of a controlling access point. The peer-to-peer arrangement 100 may include various fixed and/or mobile devices that may be referred to as "nodes" 115. For example, a node 115 may be a cellular phone, a personal digital assistant (PDA), a tablet computer, a laptop computer, a wearable item such as a watch or glasses, etc. A node 115-a may communicate directly with other nodes 115-b, 115-c, and 115-d using respective peer-to-peer wireless connections 120-b, 120-c, and 120-d. One example of a peer-to-peer wireless connection is a Wi-Fi Direct connection. A Wi-Fi Direct connection may conform to the Institute of Electrical and Electronics (IEEE) 802.11 family of standards. Additionally or alternatively, the peer-to-peer wireless connections 120 may conform to other wireless standards.

Various nodes 115 may utilize power save modes. The power save modes may include Wi-Fi Power Save modes as specified in the IEEE 802.11 family of standards. The power save modes may allow the nodes 115 to save energy.

Each of the nodes 115 may be categorized as a group owner node or as a client node, in accordance with a Wi-Fi Direct peer-to-peer wireless connection. For example, node 115-a may be a group owner node, and nodes 115-b, 115-c, and 115-d may be client nodes. Some power save modes may be associated with group owner nodes and other power save modes may be associated with client nodes. The group owner power save modes may include power save modes specified by Wi-Fi Direct for a group owner node. The group owner power save modes may allow the group owner node 115-a to save energy when the group owner node 115-a forms a peer-to-peer wireless connection 120 with a client node. The client power save modes may include power save modes for a station (STA) as specified by the IEEE 802.11 family of standards.

The power save modes may operate independently of upper-layer applications. In these cases, the power save modes may introduce performance penalties on application data throughput and latency. The performance penalties introduced by the power save modes may be especially noticeable in applications with high throughput and real-time applications, such as video streaming, running over a peer-to-peer wireless connection 120. The applications may not be aware of the power save modes, and thus may be unable to overcome the performance penalties. Examples of the present disclosure intelligently and dynamically control the power save modes to reduce the impact of the power save modes on the throughput and latency of data transmitted between the nodes 115 over peer-to-peer wireless connections 120.

A group owner node, for example node 115-a, may utilize an opportunistic power save mode or a Notice of Absence (NoA) power save mode. In the opportunistic power save mode, the group owner node may only be awake (i.e., have the receiver turned on) during a Client Traffic Window (CTWindow) at the beginning of every Beacon Interval (BI). The group owner node may also broadcast beacon signals at every Beacon Interval (BI). In the NoA power save mode, the group owner node may go to sleep (i.e., turn off the receiver and transmitter) every Absence Interval (AI) for an Absence Duration (AD). The Absence Duration (AD) may be less than the Absence Interval (AI), both of which may be less than the Beacon Interval (BI) utilized in the opportunistic power save mode.

A client node, for example node 115-b, may utilize a standard power save mode or an unscheduled Automatic Power Saving Delivery (uAPSD) power save mode. In the standard power save mode, the client node may sleep at interval ListenInterval. The ListenInterval may have a duration of n Beacon Intervals (BIs), where n is an integer greater than or equal to one. If the client node is in the standard power save mode and sleeping when data is ready to be transmitted, the client node may wake immediately to transmit the data. The client node may utilize the uAPSD power save mode when a Quality of Service (QoS) mode is enabled for the client node. In the uAPSD power save mode, the client node may wake from sleep every Trigger Interval (TI) to send a uAPSD trigger to the group owner node in order to check for pending data. The uAPSD trigger may begin a presence period, during which the group owner may send buffered frames to the client node. Following the end of the presence period, the client node 115-b may go back to sleep. The Trigger Interval (TI) may be less than the Beacon Interval (BI).

The power save modes may be controlled based at least in part on the category of data being transmitted between the nodes 115 over the peer-to-peer wireless connections 120. The data transmission may be categorized as a bulk data transmission or as an isochronous data transmission. The data transmissions may be from a group owner node to a client node, or from a client node to a group owner node. In the bulk data transmission, the data may flow continuously from one node to another node as fast as the peer-to-peer wireless connection 120 can support (up to a maximum rate $R_{max}$). For the bulk data transmission, the power save modes may be adjusted to increase the throughput of the data transmission. In the isochronous data transmission, the data may arrive periodically at the node receiving the data at a Session Interval (SI), and the data may be transmitted at a constant rate $R_s$. For the isochronous data transmission, the power save modes may be adjusted to reduce the latency in the data transmission. The nodes 115 may identify the category of data transmission by using, for example, deep packet inspection or service discovery associated with the traffic.

Examples of the present disclosure may consider the various combinations of power save modes and categories of data connections, and may adjust the power save modes accordingly to reduce the performance penalties. There may be four basic categories of data connections: 1) a bulk data transmission from a client node to a group owner node, 2) a bulk data transmission from a group owner node to a client node, 3) an isochronous data transmission from a client node to a group owner node, and 4) an isochronous data transmission from a group owner node to a client node. For each of the categories of data transmissions, examples of the present disclosure may adjust the power save modes to reduce the performance penalties for that category of data transmission, while substantially maintaining the energy saving benefits of the power save modes.

For example, node 115-a may be connected to node 115-b over peer-to-peer wireless connection 120-b. Node 115-a may determine a power save mode being utilized by itself, and a power save mode being utilized by node 115-b. Node 115-a may also determine the category of data connection between itself and node 115-b. The category of data connection may be a bulk data transmission from node 115-a to node 115-b, a bulk data transmission from node 115-b to node 115-a, an isochronous data transmission from node 115-a to node 115-b, or an isochronous data transmission from node 115-b to node 115-a. Based at least in part on the power save mode of node 115-a, the power save mode of node 115-b, and the category of data connection between node 115-a and node 115-b, the node 115-a may adjust power save parameters to reduce the performance penalties for the determined category of data transmission.

The calculation of the throughput and latency for the various data transmissions and power save modes may utilize the following terms and equations:

$R_{max}$: Maximum data flow rate for a data transmission.

$R_s$: Desired constant data flow rate for a data transmission.

AI: Absence Interval—interval at which a group owner node may sleep.

AD: Absence Duration—duration which a group owner node may sleep.

SI: Session Interval—interval at which data may arrive at a receiving node.

BI: Beacon Interval—interval at which a group owner node may broadcast a beacon.

CTWindow: Client Traffic Window—duration a group owner node may be awake at the beginning of a Beacon Interval (BI).

TI: Trigger Interval—interval at which a client node may check for pending data.

$$f_1(x, y) = R_{max} * \left(1 - \frac{x}{y}\right) \quad (1)$$

$$f_2(x, y) = x - \frac{y}{2} \quad (2)$$

$$f_3(x, y, R_s) = \frac{x}{2} + \frac{x - y}{2} * \frac{R_{max}}{R_s} \quad (3)$$

For a bulk data transmission from a client node to a group owner node, the throughput, longest latency, and average latency of the data transmission may be determined as shown in Table 1. Table 1 shows examples of the throughput, longest latency, and average latency of a bulk data transmission from a client node to a group owner node for each combination of group owner power save modes and client power save modes.

TABLE 1

| Bulk data transmission from a client node to a group owner node | | | |
|---|---|---|---|
| Power Save Modes | Throughput | Longest Latency | Average Latency |
| Client: None Group Owner: None | $R_{max}$ | 0 | 0 |
| Client: Standard/uAPSD Group Owner: None | $R_{max}$ | 0 | 0 |
| Client: None Group Owner: Opportunistic | $R_{max}$ | 0 | 0 |
| Client: None Group Owner: NoA | $f_1(AD, AI)$ | AD | $\frac{AD^2}{2*AI}$ |
| Client: Standard/uAPSD Group Owner: Opportunistic | $f_1(BI - CTWindow, BI)$ | $BI - CTWindow$ | $\frac{(BI - CTWindow)^2}{2*BI}$ |

TABLE 1-continued

Bulk data transmission from a client node to a group owner node

| Power Save Modes | Throughput | Longest Latency | Average Latency |
|---|---|---|---|
| Client: Standard/uAPSD Group Owner: NoA | $f_1(AD, AI)$ | AD | $\dfrac{AD^2}{2*AI}$ |

As shown in Table 1, the throughput and latency penalties may not be significant and may only occur when the group owner node is in a power save mode. A smaller AD and larger CTWindow may lead to higher throughput and shorter latency. The longest latency may always be less than one BI.

For a bulk data transmission from a group owner node to a client owner node, the throughput, longest latency, and average latency of the data transmission may be determined as shown in Table 2. Table 2 shows examples of the throughput, longest latency, and average latency of a bulk data transmission from a group owner node to a client owner node for each combination of group owner power save modes and client power save modes.

TABLE 2

Bulk data transmission from a group owner node to a client owner node

| Power Save Modes | Throughput | Longest Latency | Average Latency |
|---|---|---|---|
| Client: None Group Owner: None | $R_{max}$ | 0 | 0 |
| Client: Standard Group Owner: None | $R_{max}$ | n * BI | $\dfrac{n*BI}{2}$ |
| Client: uAPSD Group Owner: None | $R_{max}$ | TI | TI |
| Client: None Group Owner: Opportunistic | $R_{max}$ | 0 | 0 |
| Client: None Group Owner: NoA | $f_1(AD, AI)$ | AD | $\dfrac{AD^2}{2*AI}$ |
| Client: Standard Group Owner: Opportunistic | $R_{max}$ | n * BI | $\dfrac{n*BI}{2}$ |
| Client: uAPSD Group Owner: Opportunistic | $R_{max}$ | TI | TI |
| Client: Standard Group Owner: NoA | $\dfrac{R_{max}*(AI-AD)^2}{2*AI*n*BI}$ | Multiples of n * BI | $\dfrac{n*BI}{1-\dfrac{AD}{AI}} + \dfrac{n*BI}{2}$ |
| Client: uAPSD Group Owner: NoA | $f_1(AD, AI)$, if AI = TI | AD2 | $\dfrac{AD^2}{2*AI}$, if AI = TI |

As shown in Table 2, the throughput penalty may be significant when both the client node and the group owner node are in power save modes. The latency penalty may equal n*BI or more when the client node is in a power save mode. When the client node is in the uAPSD power save mode and the group owner node is in the NoA power save mode, the client node may a Trigger Interval (TI) that equals the absence interval (AI) to improve performance. In this case, the client node may send a trigger at the beginning of the group owner node's presence period.

For an isochronous data transmission from a client node to a group owner node, the throughput, longest latency, and average latency of the data transmission may be determined as shown in Table 3. Table 3 shows examples of the throughput, longest latency, and average latency of an isochronous data transmission from a client node to a group owner node for each combination of group owner power save modes and client power save modes.

TABLE 3

Isochronous data transmission from a client node to a group owner node

| Power Save Modes | Throughput | Longest Latency | Average Latency |
|---|---|---|---|
| Client: None Group Owner: None | $R_{max}$ | 0 | 0 |

TABLE 3-continued

Isochronous data transmission from
a client node to a group owner node

| Power Save Modes | Throughput | Longest Latency | Average Latency |
|---|---|---|---|
| Client: Standard/uAPSD<br>Group Owner: None | $R_{max}$ | 0 | 0 |
| Client: None<br>Group Owner: Opportunistic | $R_{max}$ | 0 | 0 |
| Client: None<br>Group Owner: NoA | $f_1(AD, AI)$ | $f_2(AD, SI)$ | $f_3(AD, SI, R_s)$ |
| Client: Standard/uAPSD<br>Group Owner: Opportunistic | $f_1(BI - CTWindow, BI)$ | $f_2(BI - CTWindow, SI)$ | $f_3(BI - CTWindow, SI, R_s)$ |
| Client: Standard/uAPSD<br>Group Owner: NoA | $f_1(AD, AI)$ | $f_2(AD, SI)$ | $f_3(AD, SI, R_s)$ |

As shown in Table 3, the latency penalty may be significant when the group owner node is in a power save mode. A larger AD may lead to longer latency, and a larger CTWindow may lead to a shorter latency. The longest latency may always be less than one Beacon Interval (BI).

For an isochronous data transmission from a group owner node to a client node, the throughput, longest latency, and average latency of the data transmission may be determined as shown in Table 4. Table 4 shows examples of the throughput, longest latency, and average latency of an isochronous data transmission from a group owner node to a client owner node for each combination of group owner power save modes and client power save modes.

TABLE 4

Isochronous data transmission from a group owner node to a client node

| Power Save Modes | Throughput | Longest Latency | Average Latency |
|---|---|---|---|
| Client: None<br>Group Owner: None | $R_{max}$ | 0 | 0 |
| Client: Standard<br>Group Owner: None | $R_{max}$ | $f_2(n * BI, SI)$ | $f_3(n * BI, SI, R_s)$ |
| Client: uAPSD<br>Group Owner: None | $R_{max}$ | $f_2(TI, SI)$ | $f_3(TI, SI, R_s)$ |
| Client: None<br>Group Owner: Opportunistic | $R_{max}$ | 0 | 0 |
| Client: None<br>Group Owner: NoA | $f_1(AD, AI)$ | $f_2(AD, SI)$ | $f_3(AD, SI, R_s)$ |
| Client: Standard<br>Group Owner: Opportunistic | $f_1(n * BI - CTWindow, n * BI)$ | $f_2(n * BI - CTWindow, SI)$ | $f_3(n * BI - CTWindow, SI, R_s)$ |
| Client: uAPSD<br>Group Owner: Opportunistic | $f_1(BI - CTWindow, BI)$, if $TI = BI$ | $f_2(BI - CTWindow, SI)$ if $TI = BI$ | $f_3(BI - CTWindow, SI)$ if $TI = BI$ |
| Client: Standard<br>Group Owner: NoA | $f_1\left(n*BI - \frac{(AI-AD)^2}{2*AI}, n*BI\right)$ | Multiples of n * BI | $f_3\left(\frac{n*BI}{1 - \frac{AD}{AI}} + \frac{n*BI}{2}, SI, R_s\right)$ |
| Client: uAPSD<br>Group Owner: NoA | $f_1(AD, AI)$, if $TI = AI$ | $f_2(AD, SI)$, if $TI = AI$ | $f_3(AD, SI, R_s)$, if $TI = AI$ |

As shown in Table 4, the latency penalty may be significant, in particular when the client node is utilizing a power save mode. A smaller AD and larger CTWindow may lead to a shorter latency. The latency may be less than one BI when only a group owner node is in a power save mode. The latency may increase to multiples of BI when a client node is in a power save mode. When a client node is in a uAPSD power save mode, the latency may be reduced to within one BI.

Figure 2:
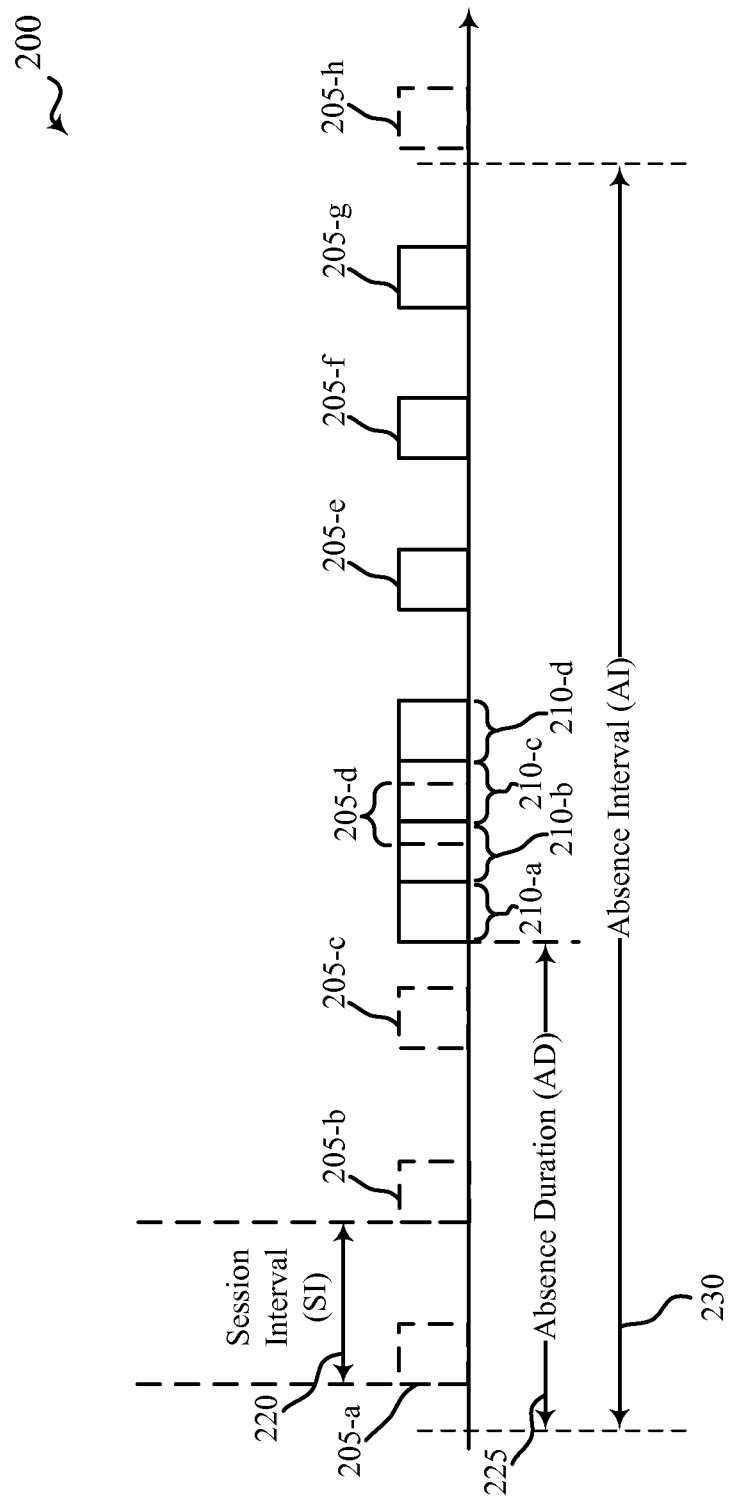
FIG. 2 shows a timing diagram illustrating various timing aspects of a data transmission, in accordance with the principles of the present disclosure.

FIG. 2 shows a shows a timing diagram 200 illustrating various timing aspects of a data transmission, in accordance with various examples. The timing diagram 200 may be implemented by one of the nodes 115 described with reference to FIG. 1. The data transmission may be, for example, an isochronous transfer from a group owner node to a client node. Data sessions 205 may arrive at the client node every Session Interval (SI) 220 with a rate $R_s$. However, the data sessions 205 may not be received or may be delayed due to a periodical sleep cycle of either the group owner node or the client node. The periodical sleep cycle may be determined by an Absence Interval (AI) 230 and an Absence Duration (AD) 225. The rate $R_s$ may be less than or equal to $f_1(AD, AI)$. Delayed data sessions 210 may arrive at the client node after the Absence Duration (AD) 225. Delayed data sessions 210-a, 210-b, 210-c, and 210-d may be the delayed data sessions of data sessions 205-a, 205-b, 205-c, and 205-d, respectively.

If the Absence Duration (AD) 225 is shorter than the Session Interval (SI) 220, then the data sessions 205 may be received within their respective SI 220. Therefore, a small Absence Duration (AD) 225 may lead to no latency penalty. If the Absence Duration (AD) 225 is longer than the Session Interval (SI) 220 (as shown in FIG. 2), then the longest latency (for example, the latency for data session 205-a) may be $f_2(AD, SI)=AD-(SI/2)$. When the Absence Duration (AD) 225 is longer than the Session Interval (SI) 220, then the average latency (for example, the average latency for data sessions 205-a, 205-b, 205-c, and 205-d) may be $f_3(AD, SI, Rs)=(AD/2)+(AD-SI)/2*(R_s/R_{max})$. Generally, a longer Absence Duration (AD) 225 may lead to a longer latency penalty. A shorter Session Interval (SI) 220 may also lead to a longer latency penalty. And a higher desired constant data rate ($R_s$) may lead to a longer average latency.

As shown in Tables 1-4, a performance determination for throughput, longest latency, or average latency may be determined for each category of data connection and combination of power save modes. For bulk transmissions, throughput may be more important than latency. For isochronous transmissions, longest latency or average latency may be more important than throughput. Therefore, each category of data connection may have one controlling performance determination—throughput, longest latency, or average latency. The controlling performance determination for each category of data connection and combination of power save mode is shown in Table 5. The controlling performance determinations may provide a guideline of which power save parameters to adjust to mitigate the application performance penalties.

to suspend the standard power save mode in order to reduce the performance penalty on the isochronous transmission.

As another example, when a client node is in a uAPSD or standard power save mode, and a group owner node is in an opportunistic power save mode, there may be performance penalties for all categories of data connection except bulk transmissions from a group owner node to a client node (i.e., throughput is at maximum $R_{max}$). For a bulk transmission from a client node to a group owner node, the throughput may be $R_{max}$*CTWindow/BI. In this case, the group owner node may adjust a power save parameter by increasing the CTWindow to within a BI in order to reduce the performance penalty on the bulk transmission. For an isochronous transmission

TABLE 5

Controlling performance determinations for each category of data connection

| Power Save Modes | Bulk Transmission from Client to Group Owner | Bulk Transmission from Group Owner to Client | Isochronous Transmission from Client to Group Owner | Isochronous Transmission from Group Owner to Client |
|---|---|---|---|---|
| Client: None<br>Group Owner: None | $R_{max}$ | $R_{max}$ | 0 | 0 |
| Client: Standard<br>Group Owner: None | $R_{max}$ | $R_{max}$ | 0 | $f_3(n * BI, SI, R_s)$ |
| Client: uAPSD<br>Group Owner: None | $R_{max}$ | $R_{max}$ | 0 | $f_3(TI, SI, R_s)$ |
| Client: None<br>Group Owner: Opportunistic | $R_{max}$ | $R_{max}$ | 0 | 0 |
| Client: None<br>Group Owner: NoA | $f_1(AD, AI)$ | $f_1(AD, AI)$ | $f_3(AD, SI, R_s)$ | $f_3(AD, SI, R_s)$ |
| Client: Standard<br>Group Owner: Opportunistic | $R_{max} * \dfrac{CTWindow}{BI}$ | $R_{max}$ | $f_3(BI - CTWindow, SI, R_s)$ | $f_3(n * BI - CTWindow, SI, R_s)$ |
| Client: uAPSD<br>Group Owner: Opportunistic | $R_{max} * \dfrac{CTWindow}{BI}$ | $R_{max}$ | $f_3(BI - CTWindow, SI, R_s)$ | $f_3(BI - CTWindow, SI, R_s)$ if TI = BI |
| Client: Standard<br>Group Owner: NoA | $f_1(AD, AI)$ | $\dfrac{R_{max} * (AI - AD)^2}{2 * AI * n * BI}$ | $f_3(AD, SI, R_s)$ | $f_3\left(\dfrac{n*BI}{1 - \dfrac{AD}{AI}} + \dfrac{n*BI}{2}, SI, R_s\right)$ |
| Client: uAPSD<br>Group Owner: NoA | $f_1(AD, AI)$ | $f_1(AD, AI)$, if TI = AI | $f_3(AD, SI, R_s)$ | $f_3(AD, SI, R_s)$, if TI = AI |

For example, when neither a client node nor a group owner node are in power save modes, then there may be no performance penalty to throughput or latency (i.e., throughput is at maximum $R_{max}$ and latency is at zero). Therefore, no adjustments may be made to a power save parameter.

As another example, when a client node is in a standard power save mode and a group owner node is not in a power save mode, there may be no performance penalty to throughput for bulk transmissions (i.e., throughput is at maximum $R_{max}$), and no performance penalty to isochronous transmissions from the client node to the group owner node (i.e., latency is at zero). However, for isochronous transmissions from a group owner node to a client node, latency may be $f_3(n*BI, SI, R_s)$. Therefore, if the category of data connection is an isochronous transmission from a group owner node to a client node, and the client node is a standard power save mode, then the client node may adjust a power save parameter from a client node to a group owner node, the latency may be $f_3(BI-CTWindow, SI, R_s)$. In this case, the group owner node may also adjust a power save parameter by increasing the CTWindow to within a BI in order to reduce the performance penalty on the isochronous transmission.

As another example, when a client node is in a uAPSD or standard power save mode, and a group owner node is in a NoA power save mode, there may be performance penalties for all categories of data connection (i.e., throughput is not at maximum $R_{max}$ and latency is not at zero). For a bulk transmission from a client node to a group owner node, the throughput may be $f_1(AD, AI)$. In this case, the group owner node may adjust a power save parameter by decreasing the AD to zero in order to reduce the performance penalty on the bulk transmission. For a bulk transmission from a group owner node to a client node, when the client node is in a standard power save mode, the throughput may be $$\frac{R_{max}*(AI-AD)^2}{2*AI*n*BI}.$$

In this case, the client node may adjust a power save parameter to suspend the standard power save mode in order to reduce the performance penalty on the bulk transmission. For a bulk transmission from a group owner node to a client node, when the client node is in a uAPSD power save mode, the throughput may be $f_1(AD, AI)$, if TI=AI. In this case, the client node may adjust a power save parameter by synchronizing a uAPSD trigger with a presence period of the group owner node in order to reduce the performance penalty of the isochronous transmission.

Figure 3:
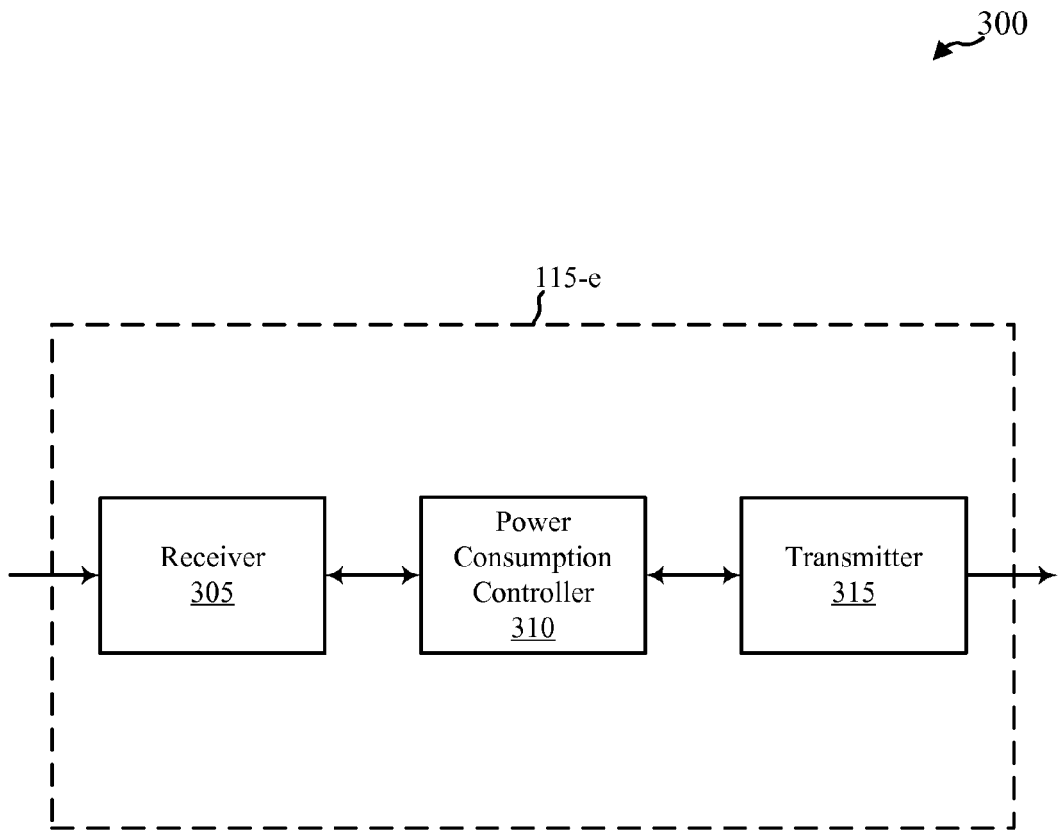
FIG. 3 shows a block diagram illustrating an example of a node in accordance with the principles of the present disclosure.

Referring now to FIG. 3, a block diagram 300 illustrates an example of a node 115-*e* in accordance with various examples. The node 115-*e* may be an example of one of the nodes 115 described with reference to FIG. 1. In some examples, the node 115-*e* may also be a processor. The node 115-*e* may include a receiver 305, a power consumption controller 310, and a transmitter 315. Each of these components may be in communication with each other. The node 115-*e* may be an example of a client node or a group owner node.

The components of the node 115-*e* may, individually or collectively, be implemented with application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The transmitter 315 may send communications from the node 115-*e* to other nodes, such as the nodes 115 of the peer-to-peer arrangement 100 shown in FIG. 1. Such sent communications may include messages for controlling the power consumption of the other nodes 115. The power consumption controller 310 may manage such communications sent by the node 115-*e*. The receiver 305 may receive communications other nodes, such as the nodes 115 of the peer-to-peer arrangement 100 shown in FIG. 1. Such received communications may include messages for controlling the power consumption of the node 115-*e*. The power consumption controller 310 may manage such communications received by the node 115-*e*.

The power consumption controller 310 may determine a power save mode of the node 115-*e* and a power mode of another node. The power consumption controller 310 may also determine a category of data connection between the node 115-*e* and the other node. The power consumption controller 310 may adjust a power save parameter of the node 115-*e* based at least in part on the power save mode of the node 115-*e*, the power save mode of the other node, and the category of data connection between the nodes. Adjusting the power save parameter may reduce a performance penalty of the power save modes for the category of data connection between the nodes.

Figure 4:
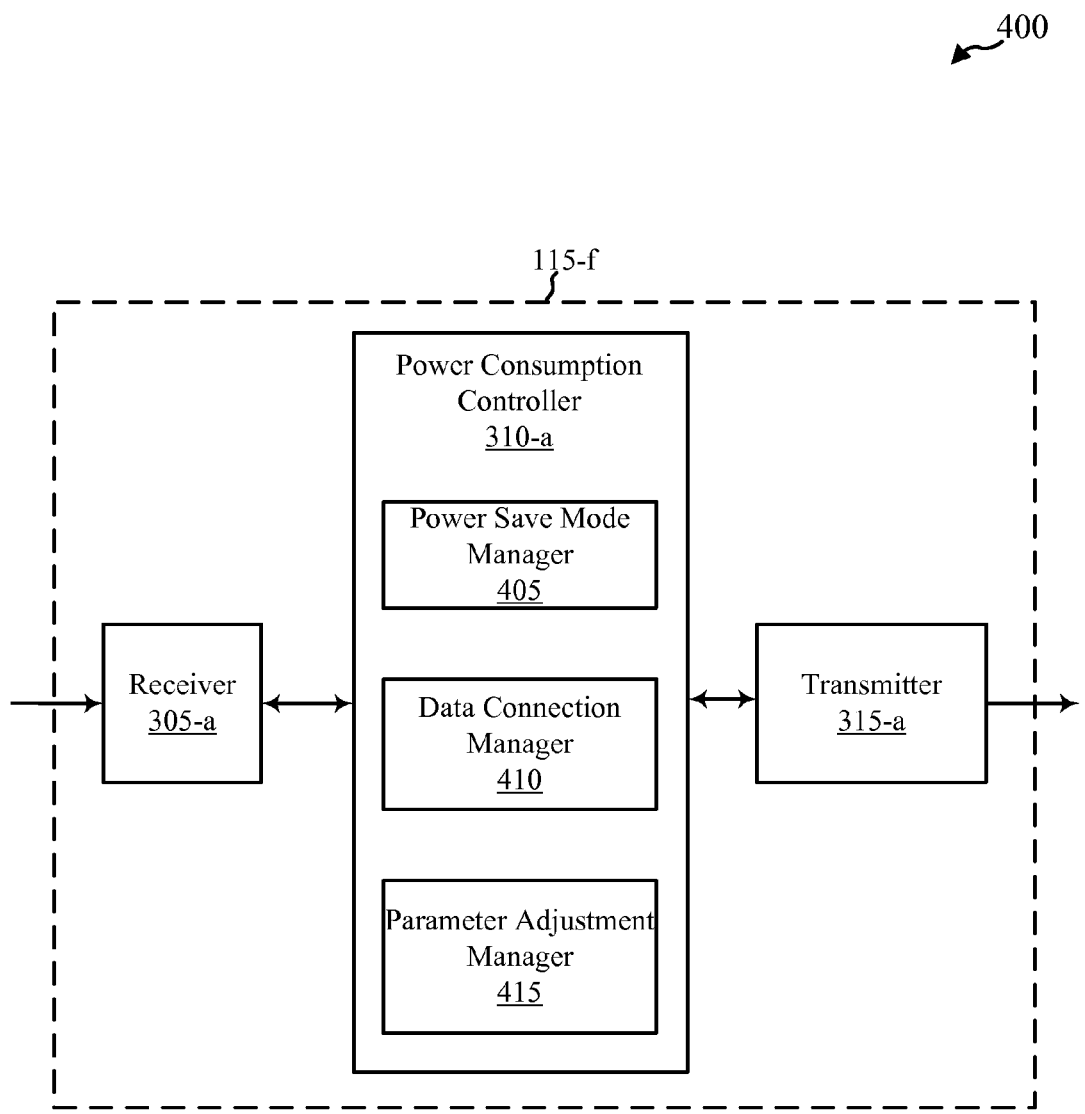
FIG. 4 shows a block diagram illustrating another example of a node in accordance with the principles of the present disclosure.

FIG. 4 is a block diagram 400 illustrating another example of a node 115-*f* in accordance with various examples. The node 115-*f* may be an example of the nodes 115 described with reference to FIGS. 1 and/or 3. In some examples, the node 115-*f* may also be a processor. The node 115-*f* may include a receiver 305-*a*, a power consumption controller 310-*a*, and a transmitter 315-*a*. Each of these components may be in communication with each other. The node 115-*e* may be an example of a client node or a group owner node.

The components of the node 115-*f* may, individually or collectively, be implemented with application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The receiver 305-*a* and the transmitter 315-*a* may be examples of receiver 305 and transmitter 315, respectively, and may be configured to perform operations as previously described with reference to FIG. 3. The power consumption controller 310-*a* may be an example of power consumption controller 310 shown in FIG. 3 and may include a power save mode manager 405, a data connection manager 410, and a parameter adjustment manager 415.

The power consumption controller 310-*a* may be configured to perform the various functions described above with respect to FIG. 3. In this example, the power consumption controller 310-*a* may be configured to reduce the performance penalties of the power save modes of the node 115-*f*. The node 115-*f* or the power consumption controller 310-*a* may include a processor for performing such functionality. The power consumption controller 310-*a* may cooperate with the receiver 305-*a* and the transmitter 315-*a* in carrying out its operations.

The power save mode manager 405 may be configured to execute various operations to determine the power save mode of the node 115-*f*, as well as the power save mode of another node. The other node may be connected to the node 115-*f* by a peer-to-peer wireless connection 120. In some examples, the power save mode manager 405 may determine whether the node 115-*f* and/or the other node is in a standard power save mode, a uAPSD power save mode, an opportunistic power save mode, a NoA power save mode, or no power save mode.

The data connection manager 410 may be configured to execute various operations to determine the category of data connection between node 115-*f* and the other node. The other node may be connected to the node 115-*f* by a peer-to-peer wireless connection 120. In some examples, the data connection manager 410 may determine that the connection between the node 115-*f* and the other node falls within one of the following four categories of data connections: 1) a bulk data transmission from a client node to a group owner node, 2) a bulk data transmission from a group owner node to a client node, 3) an isochronous data transmission from a client node to a group owner node, and 4) an isochronous data transmission from a group owner node to a client node.

The parameter adjustment manager 415 may be configured to execute various operations to adjust a power save parameter of the node 115-*f*. In some examples, the parameter adjustment manager 415 may adjust the power save parameter of the node 115-*f* based at least in part on the power save mode of the node 115-*f*, the power save mode another node connected to the node 115-*f*, and the category of data connection between the node 115-*f* and the other node. The parameter adjustment manager 415 may adjust power save parameters associated with a standard power save mode, a uAPSD power save mode, an opportunistic power save mode, or a NoA power save mode. The parameter adjustment manager 415 may adjust power save parameters by suspending a standard power save mode, synchronizing a uAPSD trigger with a presence period, increasing a CTWindow to be within a Beacon Interval (BI), and/or decreasing an Absence Duration (AD) to zero.

Figure 5:
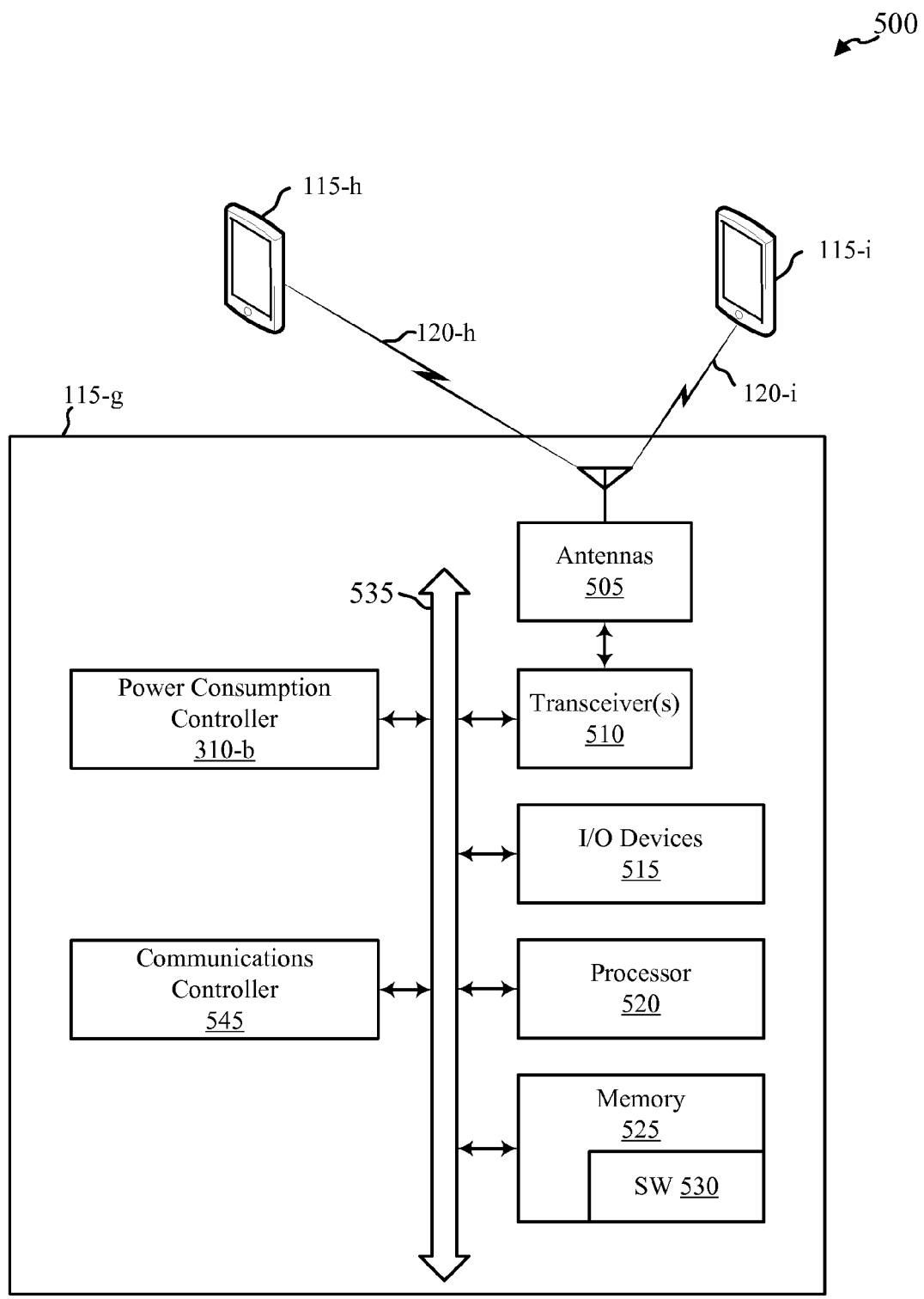
FIG. 5 shows a block diagram of a node for use in a peer-to-peer wireless communication, in accordance with the principles of the present disclosure.

FIG. 5 shows a block diagram 500 of a node 115-g for use in a peer-to-peer wireless communication, in accordance with various examples. The node 115-g may be an example of the nodes 115 described with reference to FIGS. 1, 3, and/or 4. The node 115-g may be an example of a group owner node or a client node.

The node 115-g may include antenna(s) 505, transceiver(s) 510, I/O devices 515, a processor 520, and a memory 525, which each may be in communication, directly or indirectly, with each other, for example, via bus 535. The transceiver 510 may be configured to communicate bi-directionally, via the antennas 505, with the other nodes 115-h and/or 115-i via peer-to-peer wireless connections 120-h and 120-i, respectively. The transceiver 510 may include a modem configured to modulate the packets and provide the modulated packets to the antennas 505 for transmission, and to demodulate packets received from the antennas 505. The transceiver 510 may be configured to maintain multiple concurrent communication links using the same or different radio interfaces (e.g., Wi-Fi, cellular, etc.). The node 115-g may include a single antenna 505, or the node 115-g may include multiple antennas 505. The node 115-g may be capable of employing multiple antennas 505 for transmitting and receiving communications in a multiple-input multiple-output (MIMO) communication system.

The node 115-g may also include a communications controller 545, which may manage communications with other 115, such as nodes 115-h and 115-i as shown in FIG. 5, via the transceiver 510 and antennas 505. The node 115-g may have any of various configurations. The node 115-g may, in some cases have an internal power supply, such as a small battery, to facilitate mobile operation.

The memory 525 may include random access memory (RAM) and read-only memory (ROM). The memory 525 may store computer-readable, computer-executable software 530 containing instructions that are configured to, when executed, cause the processor 520 to perform various functions described herein. Alternatively, the software 530 may not be directly executable by the processor 520 but be configured to cause the node 115-g (e.g., when compiled and executed) to perform functions described herein. The processor 520 may include an intelligent hardware device, e.g., a central processing unit (CPU), a microcontroller, an application specific integrated circuit (ASIC), etc. In some examples, the memory 525 stores parameters associated with the power save modes and categories of data connections.

According to the architecture of FIG. 5, the node 115-g further includes a power consumption controller 310-b. The power consumption controller 310-b may be an example of power consumption controller 310 shown in FIGS. 3 and 4. The power consumption controller 310-b may implement the techniques describe above for reducing the performance penalties of the various power save modes, as described in reference to FIGS. 1-4. By way of example, these components of the node 115-g may be in communication with some or all of the other components of the node 115-g via bus 535. Additionally or alternatively, functionality of these components may be implemented via the transceiver 510, as a computer program product stored in software 530, and/or as controller elements of the processor 520. In some examples, the power consumption controller 310-b may be implemented as sub-routines in memory 525/software 530, executed by the processor 520. In other cases, these components may be implemented as sub-modules in the processor 520 itself.

Figure 6:
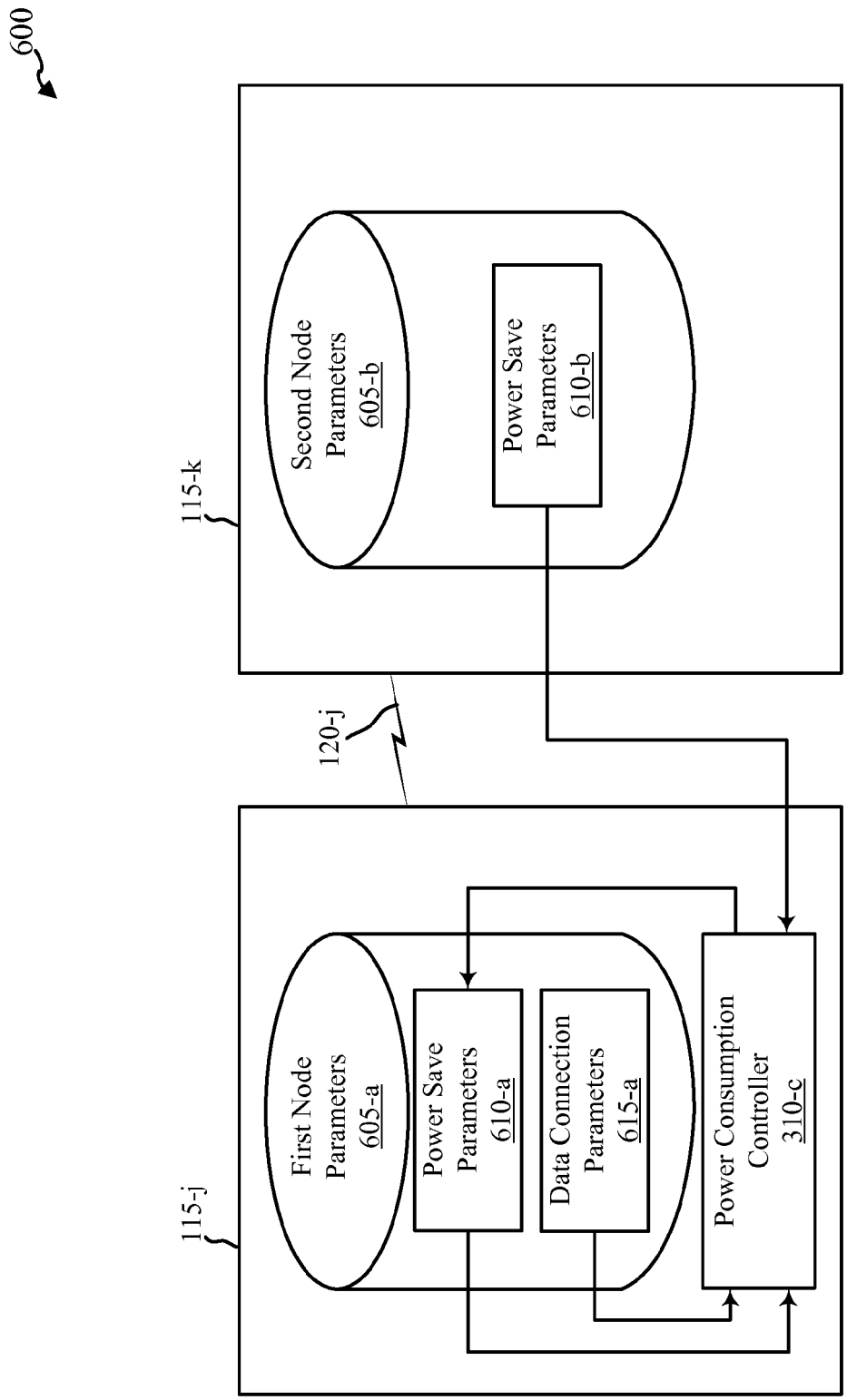
FIG. 6 shows a block diagram of a first node connected to a second node, in accordance with the principles of the present disclosure.

FIG. 6 shows a block diagram 600 of a first node 115-j connected to a second node 115-k, in accordance with various examples. The first node 115-j and second node 115-k may be examples of the nodes 115 described with reference to FIGS. 1, 3, 4, and/or 5. The first node 115-j and second node 115-k may be examples of a group owner node and/or a client node.

The first node 115-j may be connected to the second node 115-k via a peer-to-peer wireless connection 120-j. The first node 115-j may include first node parameters 605-a. The first node parameters 605-a may be stored in a memory of the first node 115-j, for example memory 525 as shown in FIG. 5. The first node parameters 605-a may include power save parameters 610-a of the first node 115-j, and data connection parameters 615-a. The second node 115-k may include second node parameters 605-b. The second node parameters 605-b may be stored in a memory of the second node 115-k, for example memory 525 as shown in FIG. 5. The second node parameters 605-b may include power save parameters 610-b of the second node 115-k.

A power consumption controller 310-c may access the first node parameters 605-a and the second node parameters 605-b. The power consumption controller 310-c may be an example of power consumption controller 310 shown in FIGS. 3, 4, and 5. The power consumption controller 310-c may access the second node parameters 605-b to determine the power save parameters 610-b of the second node 115-k. The power consumption controller 310-c may utilize the power save parameters 610-b of the second node 115-k to determine the power save mode of the second node 115-k.

The power consumption controller 310-c may also access the first node parameters 605-a to determine the power save parameters 610-a of the first node 115-j, and the data connection parameters 615-a. The power consumption controller 310-c may utilize the power save parameters 610-a of the first node 115-j to determine the power save mode of the first node 115-j. The power consumption controller 310-c may utilize the data connection parameters 615-a to determine the category of data connection between the first node 115-j and the second node 115-k. Alternatively or in addition, the data connection parameters 615-a may be included in the second node parameters 605-b and accessed by power consumption controller 310-c when accessing the second node parameters 605-b.

The power save parameters 610 may identify the power save mode of a corresponding node 115. The power save mode include a standard power save mode, a uAPSD power save mode, an opportunistic power save mode, a NoA power save mode, and/or no power save mode. The data connection parameters 615 may identify a category of data connection between two nodes 115. The categories of data connection may include a bulk data transmission from a client node to a group owner node, a bulk data transmission from a group owner node to a client node, an isochronous data transmission from a client node to a group owner node, and an isochronous data transmission from a group owner node to a client node.

After determining the power save mode of the first node 115-j, the power save mode of the second node 115-k, and the category of data connection between the first node 115-j and the second node 115-k, the power consumption controller 310-c may adjust the power save parameters 610-a of the first node 115-j. The power save parameters 610-a of the first node 115-*j* may be adjusted to reduce the performance penalties of the power save mode, as described herein.

Figure 7:
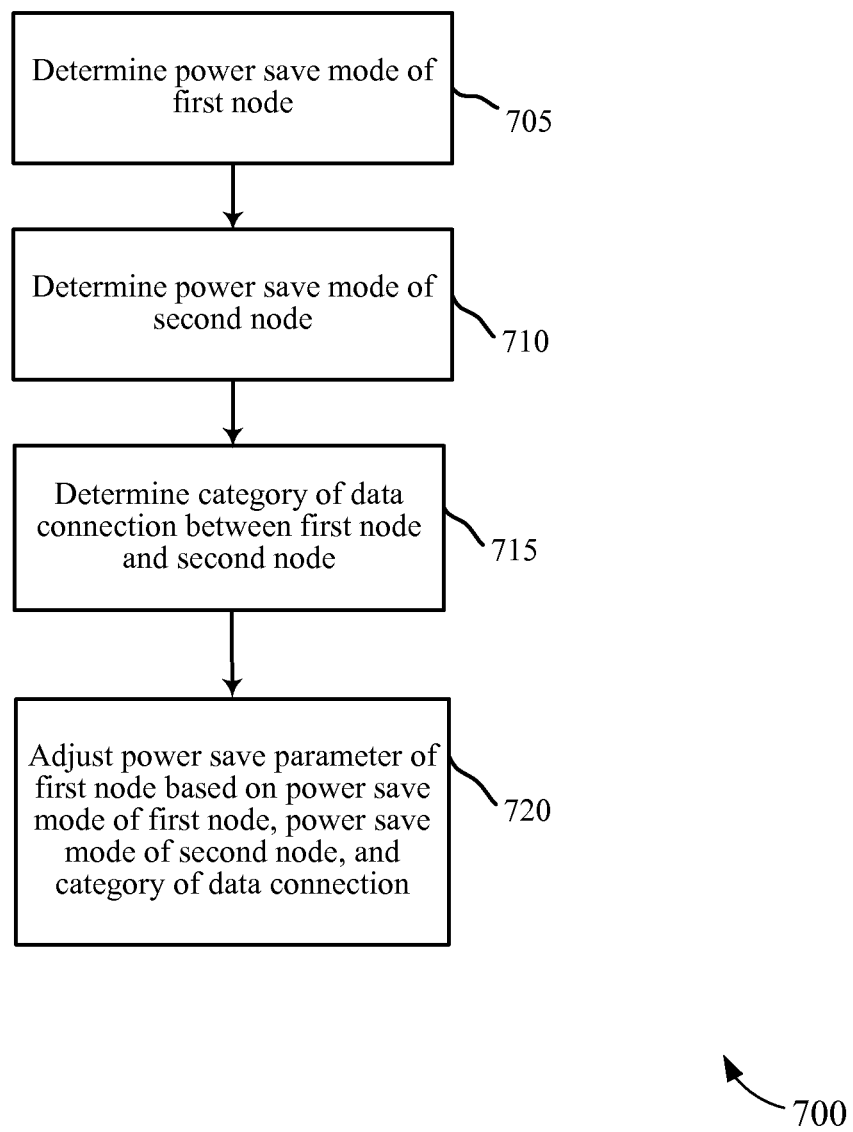
FIG. 7 is a flowchart illustrating an example of a method performed by a node to control power consumption, in accordance with the principles of the present disclosure.

FIG. 7 is a flowchart illustrating an example of a method 700 performed by a node to control power consumption, in accordance with the principles of this disclosure. For clarity, the method 700 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below.

At block 705, a power save mode of a first node may be determined. The power save mode of the first node may be determined, for example, through explicit signals from the first node or through analysis of other signals from the first node. At block 710, a power save mode of a second node may be determined. The power save mode of the second node may be determined, for example, through explicit signals from the second node, or through analysis of other signals from the second node. At block 715, a category of data connection between the first node and the second node may be determined. The category of data connection may be determined, for example, through explicit signals identifying the category of data connection, or through analysis of the data exchanged between the first node and the second node. At block 720, a power save parameter of the first node may be adjusted based at least in part on the power save mode of the first node, the power save mode of the second node, and the category of connection between the first node and the second node.

The first node may maintain a lookup table that accepts as input the power save mode of the first node, the power save mode of the second node, and the category of data connection. Using these inputs, the first node may identify the appropriate power save parameter to adjust, and determine how to adjust the power save parameter (e.g., increase, decrease, synchronize, suspend, etc.).

Figure 8:
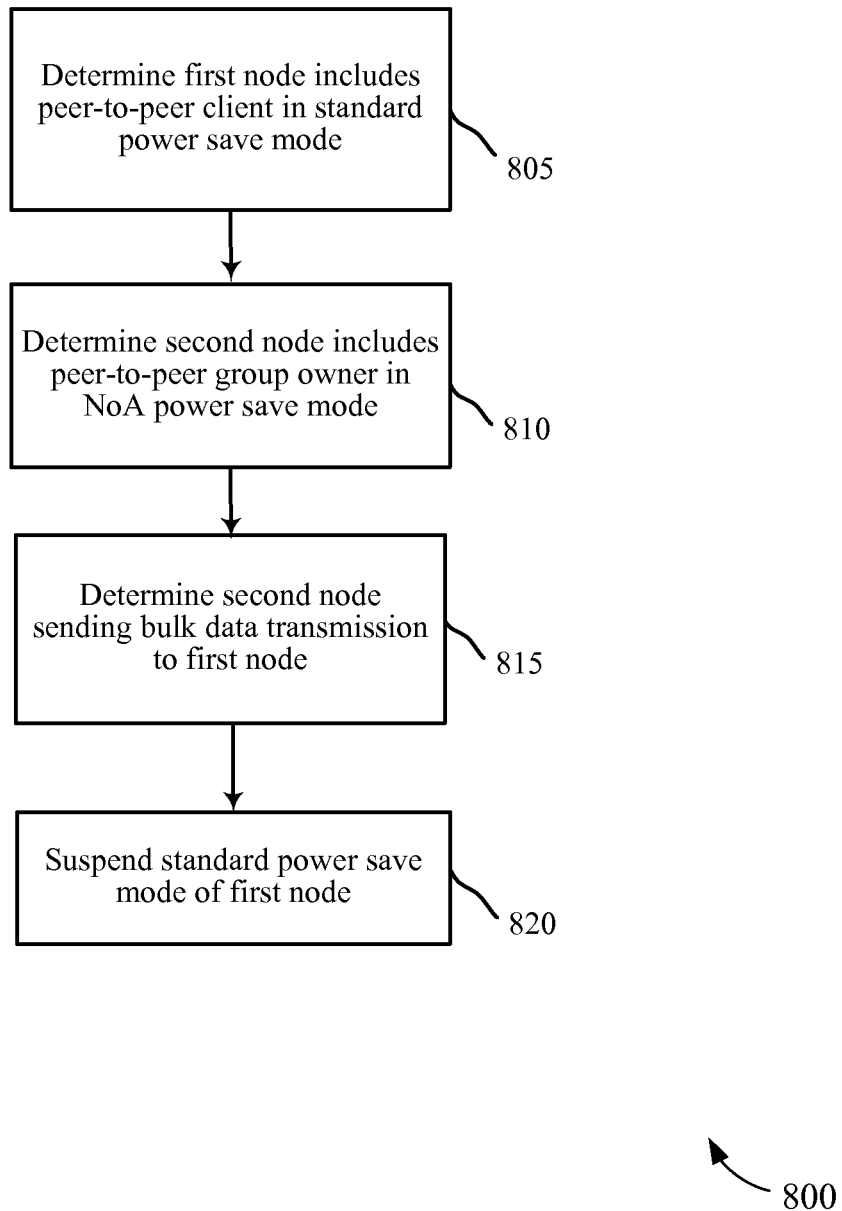
FIG. 8 is a flowchart illustrating another example of a method performed by a node to control power consumption, in accordance with the principles of the present disclosure.

FIG. 8 is a flowchart illustrating an example of a method 800 performed by a node to control power consumption, in accordance with the principles of this disclosure. The method 800 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 800 may be an example of aspects of the method 700 described with reference to FIG. 7.

At block 805, a first node may be determined to include a peer-to-peer client in a standard power save mode. At block 810, a second node may be determined to include a peer-to-peer group owner in a NoA power save mode. At block 815, the second node may be determined to be sending a bulk data transmission to the first node. At block 820, the standard power save mode of the first mode may be suspended. Suspending the power save mode of a client node may reduce the performance penalties when the client node is in a standard power save mode, a group owner node is in a NoA power save mode, and the group owner node is sending a bulk data transmission to the client node.

Figure 9:
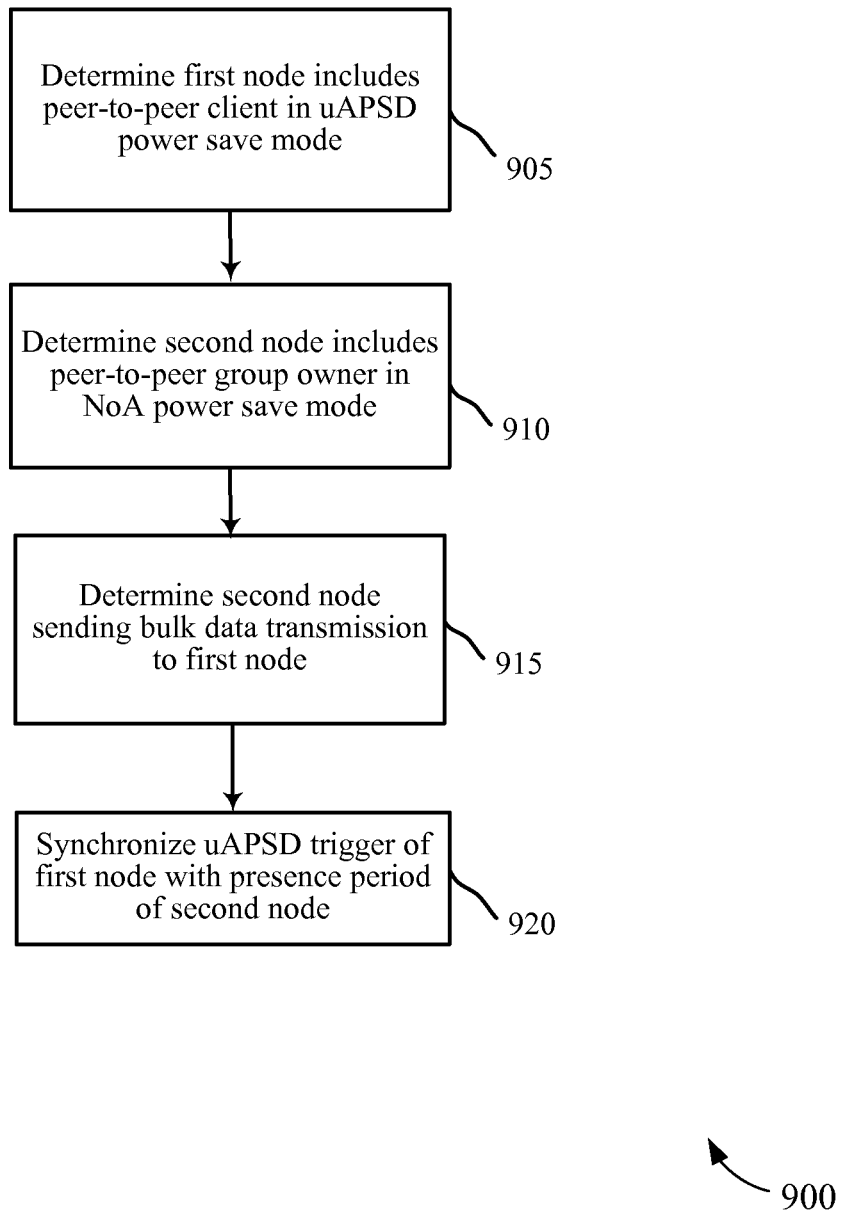
FIG. 9 is a flowchart illustrating another example of a method performed by a node to control power consumption, in accordance with the principles of the present disclosure.

FIG. 9 is a flowchart illustrating an example of a method 900 performed by a node to control power consumption, in accordance with the principles of this disclosure. The method 900 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 900 may be an example of aspects of the method 700 described with reference to FIG. 7.

At block 905, a first node may be determined to include a peer-to-peer client in a uAPSD power save mode. At block 910, a second node may be determined to include a peer-to-peer group owner in a NoA power save mode. At block 915, the second node may be determined to be sending a bulk data transmission to the first node. At block 920, a uAPSD trigger of the first node may be synchronized with a presence period of the second node. Synchronizing the uAPSD trigger of a client node with the presence period of a group owner node may reduce the performance penalties when the client node is in a uAPSD power save mode, the group owner node is in a NoA power save mode, and the group owner node is sending a bulk data transmission to the client node.

Figure 10:
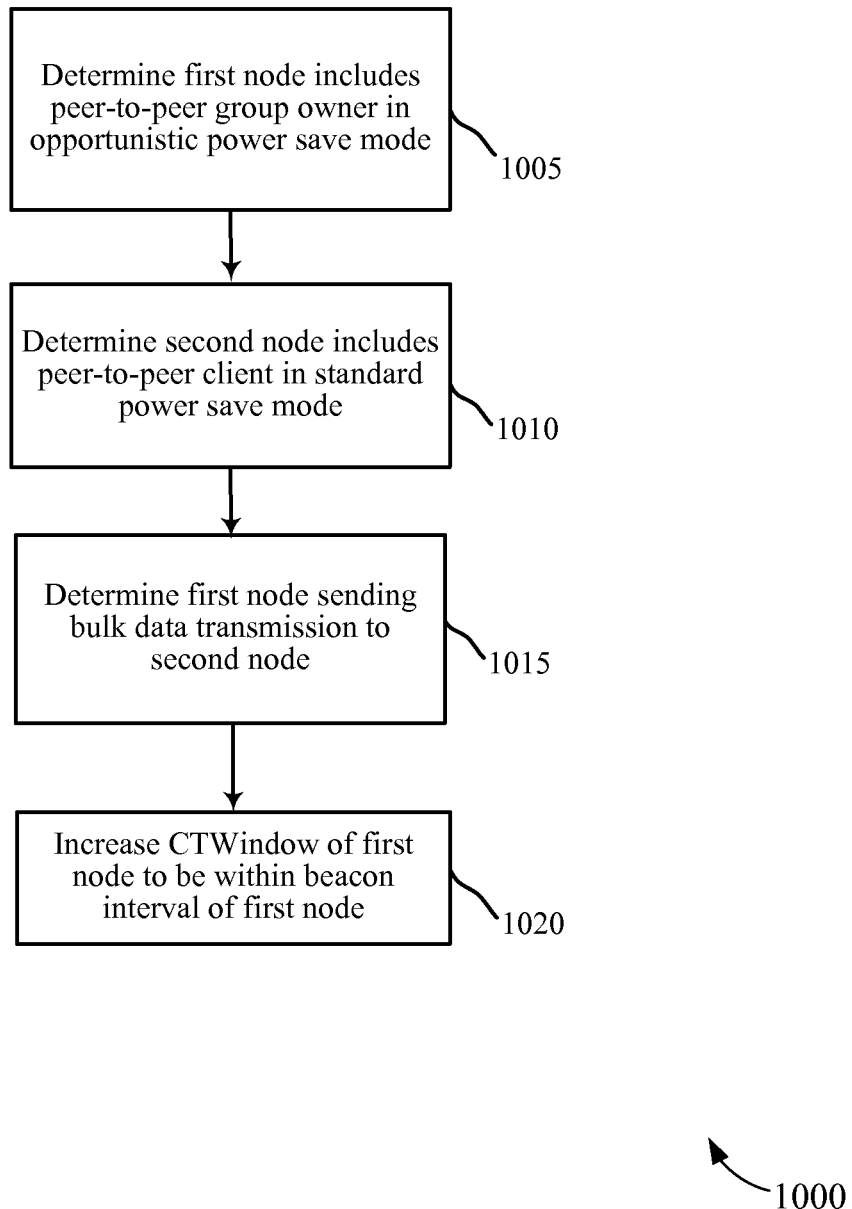
FIG. 10 is a flowchart illustrating another example of a method performed by a node to control power consumption, in accordance with the principles of the present disclosure.

FIG. 10 is a flowchart illustrating an example of a method 1000 performed by a node to control power consumption, in accordance with the principles of this disclosure. The method 1000 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1000 may be an example of aspects of the method 700 described with reference to FIG. 7.

At block 1005, a first node may be determined to include a peer-to-peer group owner in an opportunistic power save mode. At block 1010, a second node may be determined to include a peer-to-peer client in a standard power save mode. At block 1015, the first node may be determined to be sending a bulk data transmission to the second node. At block 1020, a CTWindow of the first node may be increased to be within a Beacon Interval (BI) of the first node. Increasing the CTWindow of a group owner node to be within the BI may reduce the performance penalties when a group owner node is in an opportunistic power save mode, a client node is in a standard power save mode, and the group owner node is sending a bulk data transmission to the client node.

Figure 11:
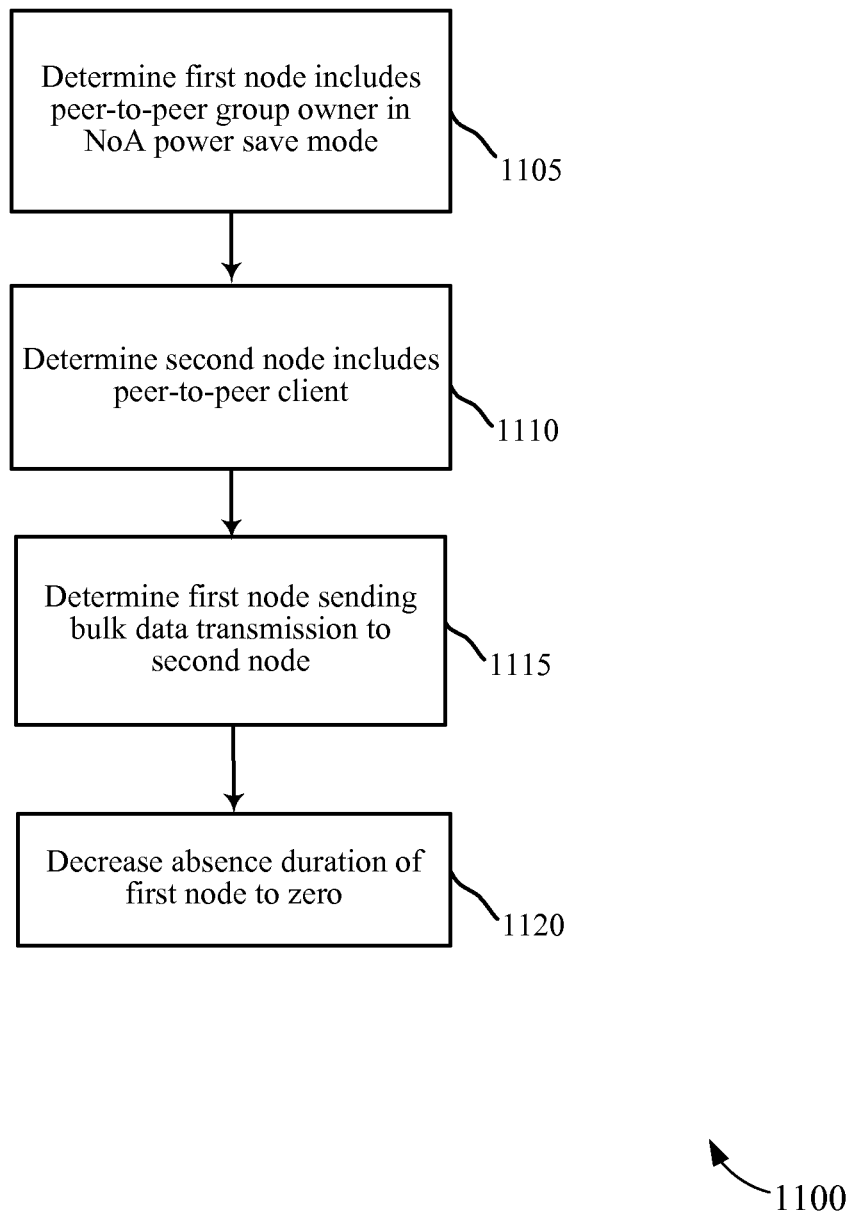
FIG. 11 is a flowchart illustrating another example of a method performed by a node to control power consumption, in accordance with the principles of the present disclosure.

FIG. 11 is a flowchart illustrating an example of a method 1100 performed by a node to control power consumption, in accordance with the principles of this disclosure. The method 1100 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1100 may be an example of aspects of the method 700 described with reference to FIG. 7.

At block 1105, a first node may be determined to include a peer-to-peer group owner in a NoA power save mode. At block 1110, a second node may be determined to include a peer-to-peer client. At block 1115, the first node may be determined to be sending a bulk data transmission to the second node. At block 1120, an Absence Duration (AD) of the first node may be decreased to zero. Decreasing the AD of a group owner node to zero may reduce the performance penalties when a group owner node is in a NoA power save mode, and the group owner node is sending a bulk data transmission to a client node.

Figure 12:
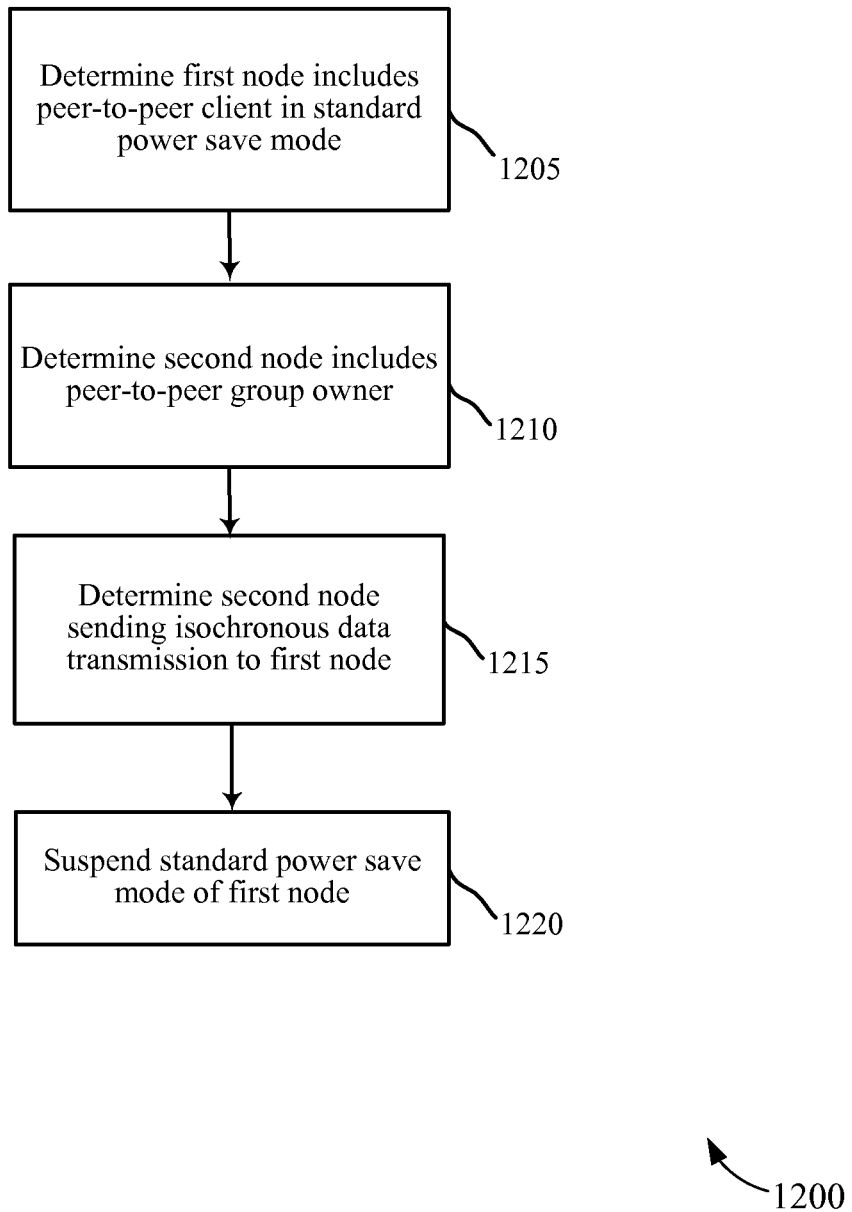
FIG. 12 is a flowchart illustrating another example of a method performed by a node to control power consumption, in accordance with the principles of the present disclosure.

FIG. 12 is a flowchart illustrating an example of a method 1200 performed by a node to control power consumption, in accordance with the principles of this disclosure. The method 1200 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1200 may be an example of aspects of the method 700 described with reference to FIG. 7.

At block 1205, a first node may be determined to include a peer-to-peer client in a standard power save mode. At block 1210, a second node may be determined to include a peer-to-peer group owner. At block 1215, the second node may be determined to be sending an isochronous data transmission to the first node. At block 1220, the standard power save mode of the first node may be suspended. Suspending the power save mode of a client node may reduce the performance penalties when the client node is in a standard power save mode, a group owner node is in a NoA power save mode, and the group owner node is sending an isochronous data transmission to the client node.

Figure 13:
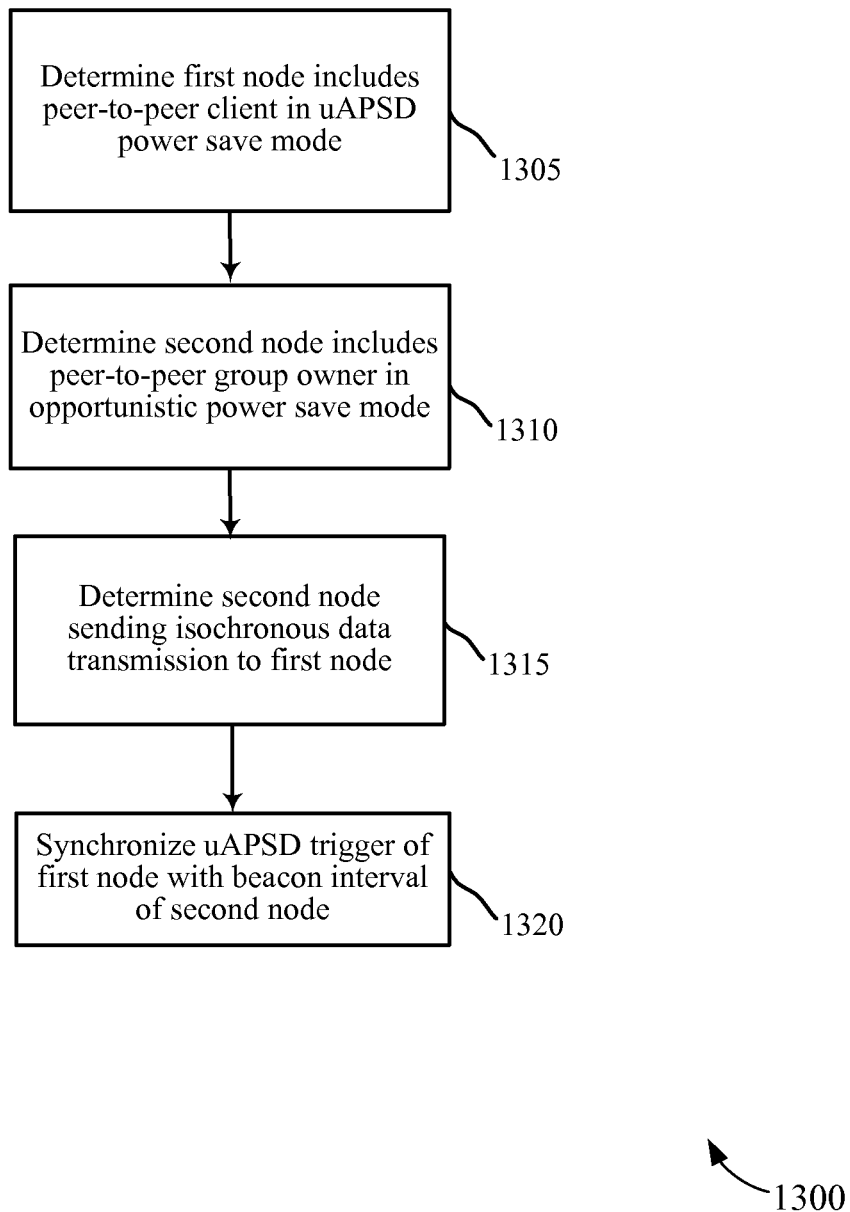
FIG. 13 is a flowchart illustrating another example of a method performed by a node to control power consumption, in accordance with the principles of the present disclosure.

FIG. 13 is a flowchart illustrating an example of a method 1300 performed by a node to control power consumption, in accordance with the principles of this disclosure. The method 1300 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1300 may be an example of aspects of the method 700 described with reference to FIG. 7.

At block 1305, a first node may be determined to include a peer-to-peer client in a uAPSD power save mode. At block 1310, a second node may be determined to include a peer-to-peer group owner in an opportunistic power save mode. At block 1315, the second node may be determined to be sending an isochronous data transmission to the first node. At block 1320, a uAPSD trigger of the first node may be synchronized with a Beacon Interval (BI) of the second node. Synchronizing the uAPSD trigger of a client node with the BI of a group owner node may reduce the performance penalties when the client node is in a uAPSD power save mode, the group owner node is in an opportunistic power save mode, and the group owner node is sending an isochronous data transmission to the client node.

Figure 14:
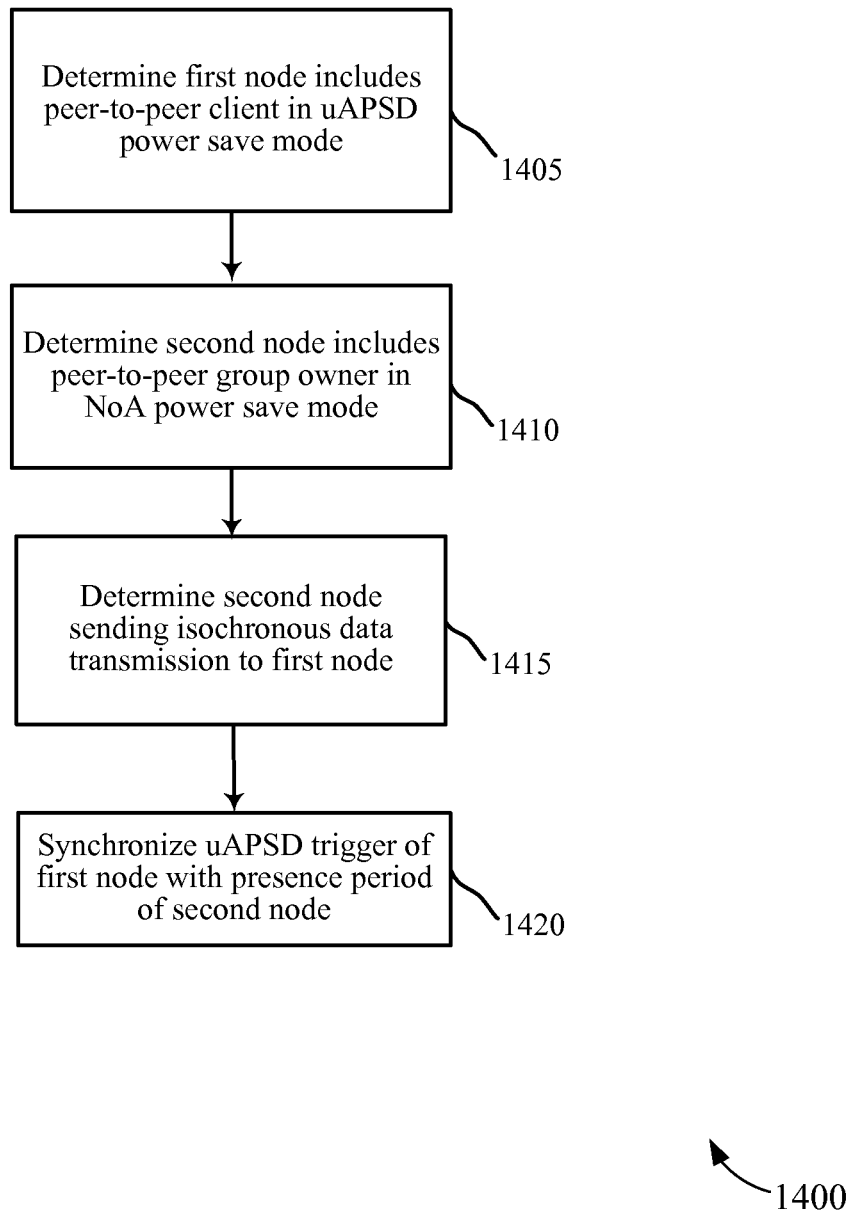
FIG. 14 is a flowchart illustrating another example of a method performed by a node to control power consumption, in accordance with the principles of the present disclosure.

FIG. 14 is a flowchart illustrating an example of a method 1400 performed by a node to control power consumption, in accordance with the principles of this disclosure. The method 1400 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1400 may be an example of aspects of the method 700 described with reference to FIG. 7.

At block 1405, a first node may be determined to include a peer-to-peer client in a uAPSD power save mode. At block 1410, a second node may be determined to include a peer-to-peer group owner in a NoA power save mode. At block 1415, the second node may be determined to be sending an isochronous data transmission to the first node. At block 1420, a uAPSD trigger of the first node may be synchronized with a presence period of the second node. Synchronizing the uAPSD trigger of a client node with the presence period of a group owner node may reduce the performance penalties when the client node is in a uAPSD power save mode, the group owner node is in a NoA power save mode, and the group owner node is sending an isochronous data transmission to the client node.

Figure 15:
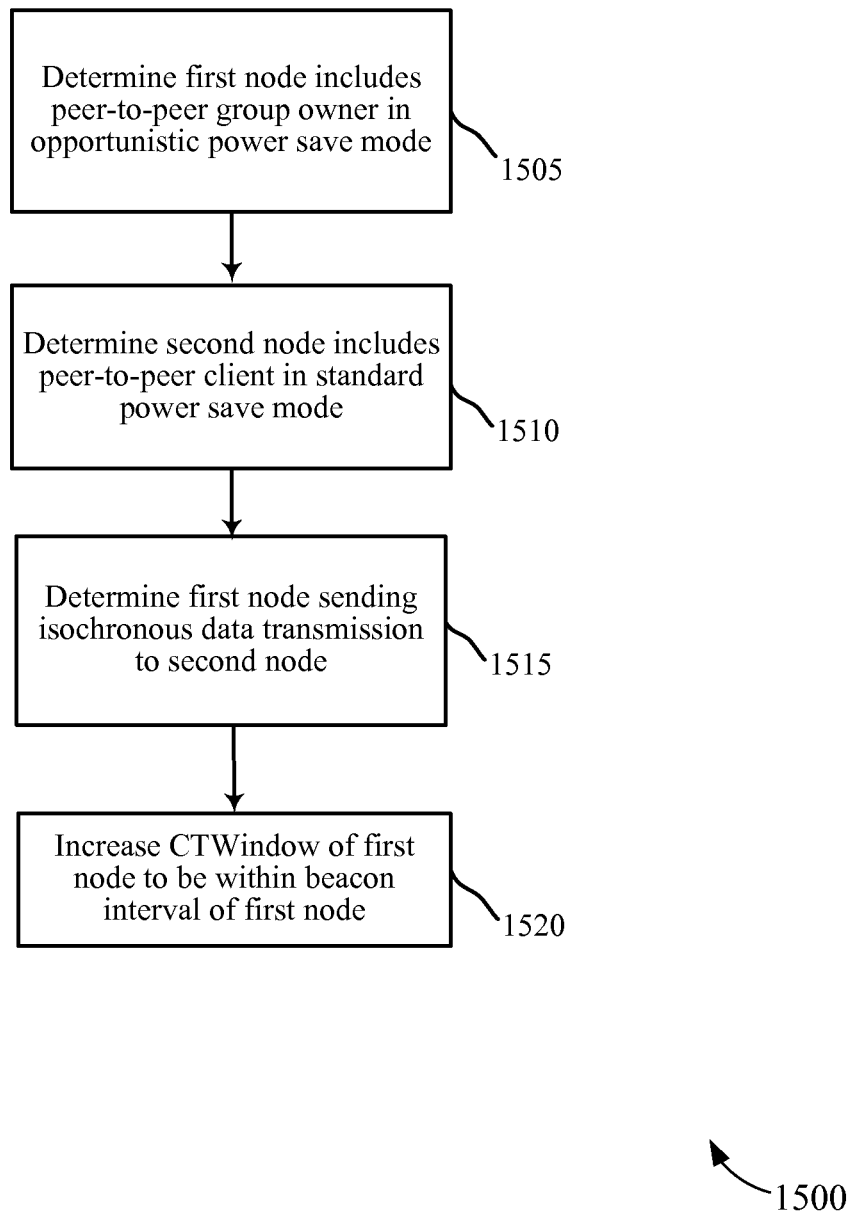
FIG. 15 is a flowchart illustrating another example of a method performed by a node to control power consumption, in accordance with the principles of the present disclosure.

FIG. 15 is a flowchart illustrating an example of a method 1500 performed by a node to control power consumption, in accordance with the principles of this disclosure. The method 1500 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1500 may be an example of aspects of the method 700 described with reference to FIG. 7.

At block 1505, a first node may be determined to include a peer-to-peer group owner in an opportunistic power save mode. At block 1510, a second node may be determined to include a peer-to-peer client in a standard power save mode. At block 1515, the first node may be determined to be sending an isochronous data transmission to the second node. At block 1520, a CTWindow of the first node may be increased to be within a Beacon Interval (BI) of the first node. Increasing the CTWindow of a group owner node to be within the BI may reduce the performance penalties when a group owner node is in an opportunistic power save mode, a client node is in a standard power save mode, and the group owner node is sending an isochronous data transmission to the client node.

Figure 16:
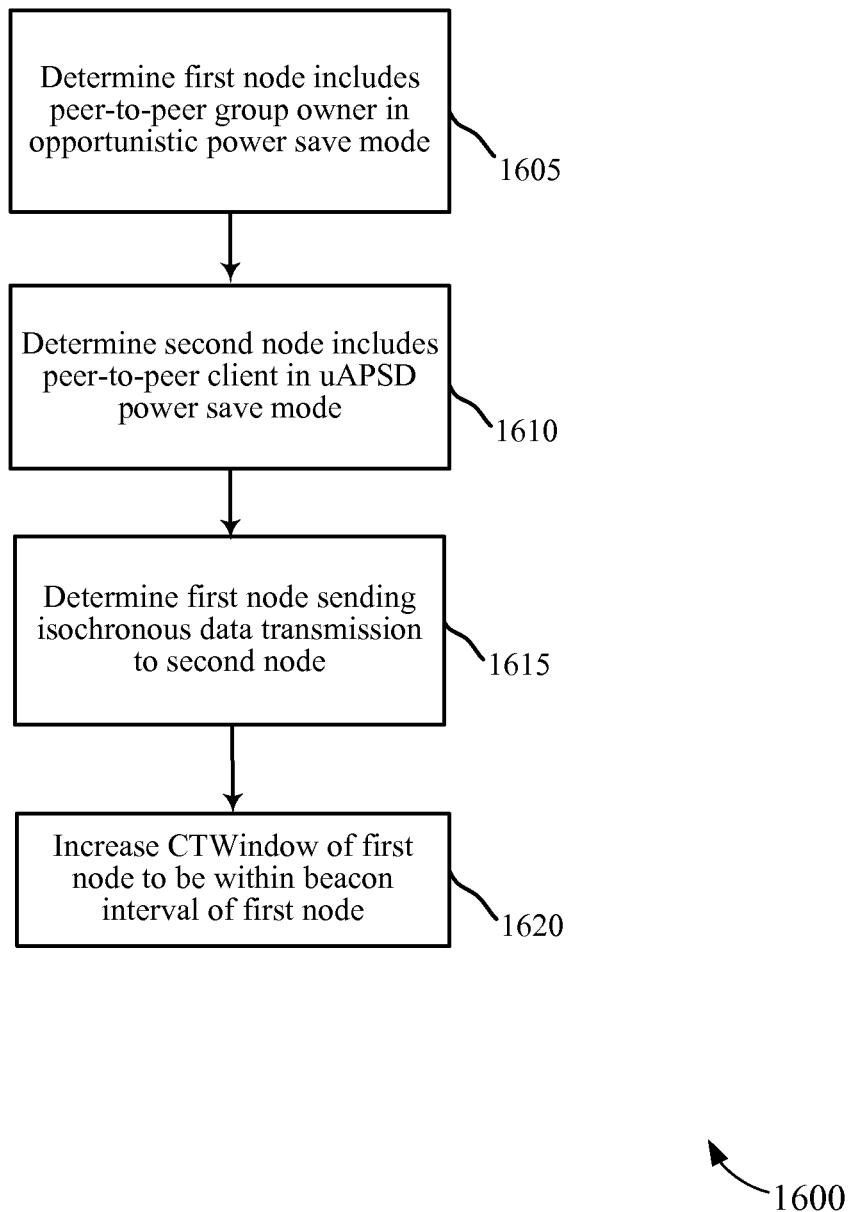
FIG. 16 is a flowchart illustrating another example of a method performed by a node to control power consumption, in accordance with the principles of the present disclosure.

FIG. 16 is a flowchart illustrating an example of a method 1600 performed by a node to control power consumption, in accordance with the principles of this disclosure. The method 1600 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1600 may be an example of aspects of the method 700 described with reference to FIG. 7.

At block 1605, a first node may be determined to include a peer-to-peer group owner in an opportunistic power save mode. At block 1610, a second node may be determined to include a peer-to-peer client in a uAPSD power save mode. At block 1615, the first node may be determined to be sending an isochronous data transmission to the second node. At block 1620, a CTWindow of the first node may be increased to be within a Beacon Interval (BI) of the first node. Increasing the CTWindow of a group owner node to be within the BI may reduce the performance penalties when a group owner node is in an opportunistic power save mode, a client node is in a uAPSD power save mode, and the group owner node is sending an isochronous data transmission to the client node.

Figure 17:
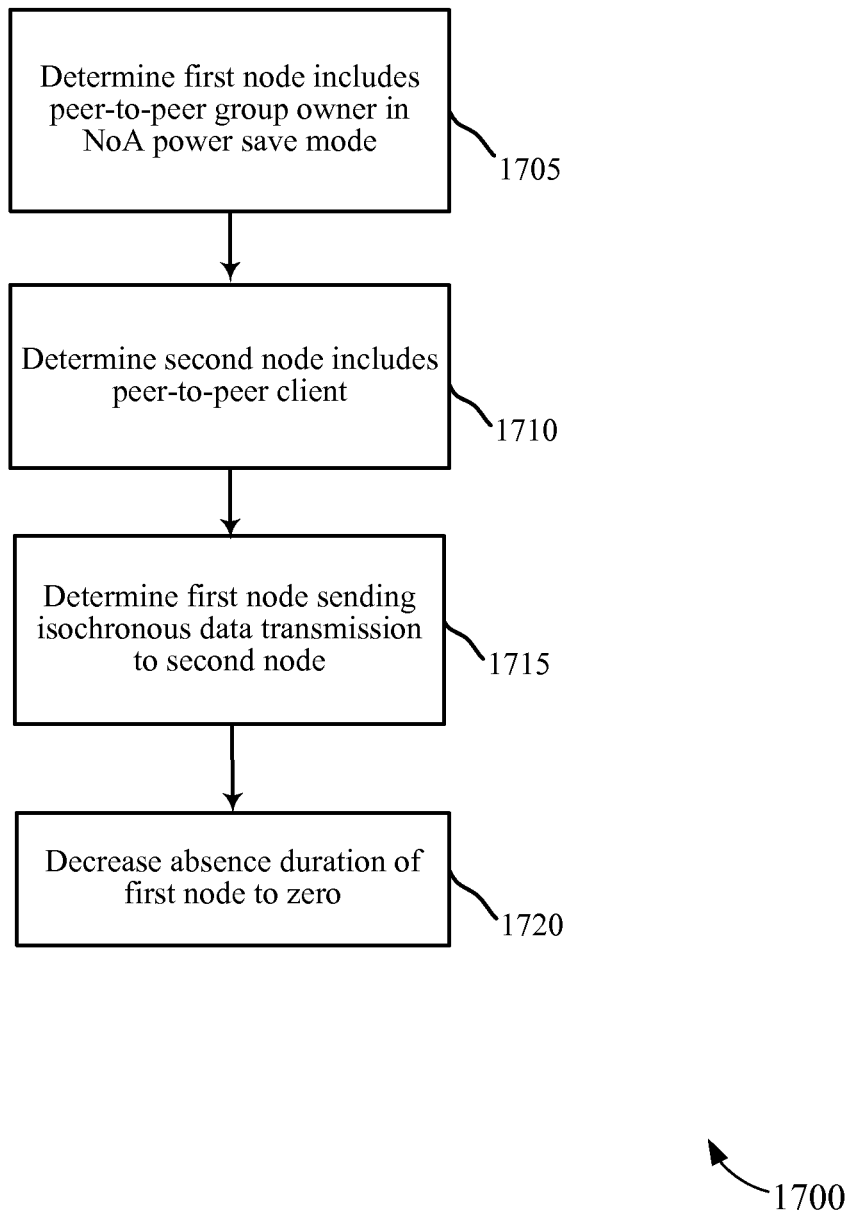
FIG. 17 is a flowchart illustrating another example of a method performed by a node to control power consumption, in accordance with the principles of the present disclosure.

FIG. 17 is a flowchart illustrating an example of a method 1700 performed by a node to control power consumption, in accordance with the principles of this disclosure. The method 1700 is described with reference to the nodes 115 described with reference to FIGS. 1, 3, 4, 5, and/or 6. In one implementation, the processor 520 described with reference to FIG. 5 may execute sets of codes to control the functional elements of a node 115 to perform the functions described below. The method 1700 may be an example of aspects of the method 700 described with reference to FIG. 7.

At block 1705, a first node may be determined to include a peer-to-peer group owner in a NoA power save mode. At block 1710, a second node may be determined to include a peer-to-peer client. At block 1715, the first node may be determined to be sending an isochronous data transmission to the second node. At block 1720, an Absence Duration (AD) of the first node may be decreased to zero. Decreasing the AD of a group owner node to zero may reduce the performance penalties when a group owner node is in a NoA power save mode, and the group owner node is sending am isochronous data transmission to a client node.

The detailed description set forth above in connection with the appended drawings describes examples and does not represent the only embodiments that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for controlling power consumption in a group owner node of a peer-to-peer communication system, comprising:
    determining, by the group owner node, a power save mode of the group owner node and a power save mode of a client node;
    determining, by the group owner node, a category of data connection between the group owner node and the client node; and
    adjusting a power save parameter of the group owner node based at least in part on the determined power save mode of the group owner node, the determined power save mode of the client node, and the determined category of data connection.

2. The method of claim 1, wherein the determined power save mode of the group owner node comprises an opportunistic power save mode, the determined power save mode of the client node comprises a standard power save mode, the determined category of data connection comprises a peer-to-peer bulk data transmission from the group owner node to the client node, and adjusting the power save parameter of the group owner node comprises:
    increasing a duration of a client traffic window (CTWindow) of the group owner node to be within a range of a beacon interval.

3. The method of claim 1, wherein the determined power save mode of the group owner node comprises a NoA power save mode, the determined category of data connection comprises a peer-to-peer bulk data transmission from the group owner node to the client node, and adjusting the power save parameter of the group owner node comprises:
    decreasing an absence duration of the group owner node to zero.

4. The method of claim 1, wherein the determined power save mode of the group owner node comprises an opportunistic power save mode, the determined power save mode of the client node comprises a standard power save mode, the determined category of data connection comprises a peer-to-peer isochronous data transmission from the group owner node to the client node, and adjusting the power save parameter of the group owner node comprises:
    increasing a duration of a CTWindow of the group owner node to be within a range of a beacon interval.

5. The method of claim 1, wherein the determined power save mode of the group owner node comprises an opportunistic power save mode, the determined power save mode of the client node comprises a uAPSD power save mode, the determined category of data connection comprises a peer-to-peer isochronous data transmission from the group owner node to the client node, and adjusting the power save parameter of the group owner node comprises:
  increasing a duration of a CTWindow of the group owner node to be within a range of a beacon interval.

6. The method of claim 1, wherein the determined power save mode of the group owner node comprises a NoA power save mode, the determined category of data connection comprises a peer-to-peer isochronous data transmission from the group owner node to the client node, and adjusting the power save parameter of the group owner node comprises:
  decreasing an absence duration of the group owner node to zero.

7. The method of claim 1, wherein adjusting the power save parameter modifies throughput of the data connection between the group owner node and the client node.

8. The method of claim 1, wherein adjusting the power save parameter modifies latency of the data connection between the group owner node and the client node.

9. A method for controlling power consumption by a client node of a peer-to-peer communication system, comprising:
  determining, by the client node, a power save mode of the client node, wherein the power save mode of the client node is one of the group consisting of a standard power save mode and an unscheduled Automatic Power Save Delivery (uAPSD) power save mode;
  determining, by the client node, a power save mode of a group owner node, wherein the power save mode of the group owner node is one of the group consisting of a notice of absence (NoA) power save mode and an opportunistic power save mode;
  determining, by the client node, a category of data connection between the client node and the group owner node; and
  adjusting a power save parameter of the client node based at least in part on the determined power save mode of the client node, the determined power save mode of the group owner node, and the determined category of data connection.

10. The method of claim 9, wherein the determined power save mode of the client node is the standard power save mode, the determined power save mode of the group owner node is the NoA power save mode, the determined category of data connection comprises a peer-to-peer bulk data transmission from the group owner node to the client node, and adjusting the power save parameter of the client node comprises:
  suspending the standard power save mode.

11. The method of claim 9, wherein the determined power save mode of the client node is the uAPSD power save mode, the determined power save mode of the group owner node is the NoA power save mode, the determined category of data connection comprises a peer-to-peer bulk data transmission from the group owner node to the client node, and adjusting the power save parameter of the client node comprises:
  synchronizing a uAPSD trigger of the client node with a presence period of the group owner node.

12. The method of claim 9, wherein the determined power save mode of the client node is the standard power save mode, the determined category of data connection comprises a peer-to-peer isochronous data transmission from the group owner node to the client node, and adjusting the power save parameter of the client node comprises:
  suspending the standard power save mode.

13. The method of claim 9, wherein the determined power save mode of the client node is the uAPSD power save mode, the determined power save mode of the group owner node is the opportunistic power save mode, the determined category of data connection comprises a peer-to-peer isochronous data transmission from the group owner node to the client node, and adjusting the power save parameter of the client node comprises:
  synchronizing a uAPSD trigger of the client node with a beacon interval of the group owner node.

14. The method of claim 9, wherein the determined power save mode of the client is the uAPSD power save mode, the determined power save mode of the group owner node is the NoA power save mode, the determined category of data connection comprises a peer-to-peer isochronous data transmission from the group owner node to the client node, and adjusting the power save parameter of the client node comprises:
  synchronizing a uAPSD trigger of the client node with a presence period of the group owner node.

15. The method of claim 9, wherein adjusting the power save parameter modifies throughput of the data connection between the group owner node and the client node.

16. The method of claim 9, wherein adjusting the power save parameter modifies latency of the data connection between the group owner node and the client node.

17. An apparatus for controlling power consumption in a group owner node of a peer-to-peer communication system, comprising:
  a power save mode manager for determining, by the group owner node, a power save mode of the group owner node and a power save mode of a client node;
  a data connection manager for determining, by the group owner node, a category of data connection between the group owner node and the client node; and
  a parameter adjustment manager for adjusting a power save parameter of the group owner node based at least in part on the determined power save mode of the group owner node, the determined power save mode of the client node, and the determined category of data connection.

18. The apparatus of claim 17, wherein the determined power save mode of the group owner node comprises an opportunistic power save mode, the determined power save mode of the client node comprises a standard power save mode, the determined category of data connection comprises a peer-to-peer bulk data transmission from the group owner node to the client node, and adjusting the power save parameter of the group owner node comprises:
  increasing a duration of a client traffic window (CTWindow) of the group owner node to be within a range of a beacon interval.

19. The apparatus of claim 17, wherein the determined power save mode of the group owner node comprises a NoA power save mode, the determined category of data connection comprises a peer-to-peer bulk data transmission from the group owner node to the client node, and adjusting the power save parameter of the group owner node comprises:
  decreasing an absence duration of the group owner node to zero.

20. The apparatus of claim 17, wherein the determined power save mode of the group owner node comprises an opportunistic power save mode, the determined power save mode of the client node comprises a standard power save mode, the determined category of data connection comprises a peer-to-peer isochronous data transmission from the group owner node to the client node, and adjusting the power save parameter of the group owner node comprises:

increasing a duration of a CTWindow of the group owner node to be within a range of a beacon interval.

21. The apparatus of claim 17, wherein the determined power save mode of the group owner node comprises an opportunistic power save mode, the determined power save mode of the client node comprises a uAPSD power save mode, the determined category of data connection comprises a peer-to-peer isochronous data transmission from the group owner node to the client node, and adjusting the power save parameter of the group owner node comprises:
increasing a duration of a CTWindow of the group owner node to be within a range of a beacon interval.

22. The apparatus of claim 17, wherein the determined power save mode of the group owner node comprises a NoA power save mode, the determined category of data connection comprises a peer-to-peer isochronous data transmission from the group owner node to the client node, and adjusting the power save parameter of the group owner node comprises:
decreasing an absence duration of the group owner node to zero.

23. The apparatus of claim 17, wherein adjusting the power save parameter modifies at least one of throughput of the data connection between the group owner node and the client node, latency of the data connection between the group owner node and the client node, or a combination thereof.

24. An apparatus for controlling power consumption in a client node of a peer-to-peer communication system, comprising:
a client power save mode manager for determining, by the client node, a power save mode of the client node, wherein the power save mode of the client node is one of the group consisting of a standard power save mode and an unscheduled Automatic Power Save Delivery (uAPSD) power save mode;
a group owner power save mode manager determining, by the client node, a power save mode of a group owner node, wherein the power save mode of the group owner node is one of the group consisting of a notice of absence (NoA) power save mode and an opportunistic power save mode;
a data connection manager for determining, by the client node, a category of data connection between the client node and the group owner node; and
a parameter adjustment manager for adjusting a power save parameter of the client node based at least in part on the determined power save mode of the client node, the determined power save mode of the group owner node, and the determined category of data connection.

25. The apparatus of claim 24, wherein the determined power save mode of the client node is the standard power save mode, the determined power save mode of the group owner node is the NoA power save mode, the determined category of data connection comprises a peer-to-peer bulk data transmission from the group owner node to the client node, and adjusting the power save parameter of the client node comprises:
suspending the standard power save mode.

26. The apparatus of claim 24, wherein the determined power save mode of the client node is the uAPSD power save mode, the determined power save mode of the group owner node is the NoA power save mode, the determined category of data connection comprises a peer-to-peer bulk data transmission from the group owner node to the client node, and adjusting the power save parameter of the client node comprises:
synchronizing a uAPSD trigger of the client node with a presence period of the group owner node.

27. The apparatus of claim 24, wherein the determined power save mode of the client node is the standard power save mode, the determined category of data connection comprises a peer-to-peer isochronous data transmission from the group owner node to the client node, and adjusting the power save parameter of the client node comprises:
suspending the standard power save mode.

28. The apparatus of claim 24, wherein the determined power save mode of the client node is the uAPSD power save mode, the determined power save mode of the group owner node is the opportunistic power save mode, the determined category of data connection comprises a peer-to-peer isochronous data transmission from the group owner node to the client node, and adjusting the power save parameter of the client node comprises:
synchronizing a uAPSD trigger of the client node with a beacon interval of the group owner node.

29. The apparatus of claim 24, wherein the determined power save mode of the client is the uAPSD power save mode, the determined power save mode of the group owner node is the NoA power save mode, the determined category of data connection comprises a peer-to-peer isochronous data transmission from the group owner node to the client node, and adjusting the power save parameter of the client node comprises:
synchronizing a uAPSD trigger of the client node with a presence period of the group owner node.

30. The apparatus of claim 24, wherein adjusting the power save parameter modifies at least one of throughput of the data connection between the group owner node and the client node, latency of the data connection between the group owner node and the client node, or a combination thereof.

* * * * *